United States Patent
Choi et al.

(10) Patent No.: US 11,242,068 B2
(45) Date of Patent: Feb. 8, 2022

(54) VEHICLE DISPLAY DEVICE AND VEHICLE

(71) Applicant: LG Electronics Inc., Seoul (KR)

(72) Inventors: Sunghwan Choi, Seoul (KR); Jaeho Lee, Seoul (KR); Ilwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 370 days.

(21) Appl. No.: 16/306,375

(22) PCT Filed: May 30, 2016

(86) PCT No.: PCT/KR2016/005681
§ 371 (c)(1),
(2) Date: Nov. 30, 2018

(87) PCT Pub. No.: WO2017/209313
PCT Pub. Date: Dec. 7, 2017

(65) Prior Publication Data
US 2020/0361482 A1 Nov. 19, 2020

(51) Int. Cl.
*B60W 50/14* (2020.01)
*G01C 21/30* (2006.01)
(Continued)

(52) U.S. Cl.
CPC ............ *B60W 50/14* (2013.01); *B60K 35/00* (2013.01); *B60W 10/04* (2013.01); *B60W 10/18* (2013.01);
(Continued)

(58) Field of Classification Search
CPC ...... B60K 2370/1529; B60K 2370/188; B60K 2370/191; B60K 2370/193; B60K 35/00; B60W 10/04; B60W 10/18; B60W 10/20; B60W 2050/146; B60W 2420/42; B60W 2520/00; B60W 2540/225; B60W 2554/80; B60W 30/08; B60W 40/08; B60W 50/14;
(Continued)

(56) References Cited

U.S. PATENT DOCUMENTS 7,688,188 B2 * 3/2010 Kume ................... G08G 1/162
340/436
8,914,236 B2 * 12/2014 Sakoda .................. G06F 3/017
702/2

(Continued)

FOREIGN PATENT DOCUMENTS

JP 2004114709 4/2004
JP 2006323666 11/2006
(Continued)

OTHER PUBLICATIONS

Korean Notice of Allowance in Korean Application No. 10-2018-7033730, dated Oct. 13, 2020, 5 pages (with English translation).

*Primary Examiner* — Tyler J Lee
(74) *Attorney, Agent, or Firm* — Fish & Richardson P.C.

(57) ABSTRACT

Disclosed is a display apparatus for vehicle comprising: a display unit; an interface unit; and a processor configured to receive information on a first object and a second object positioned outside a vehicle through the interface unit, and control the display unit to display a graphic object corresponding to the first object, when the second object is positioned between the vehicle and the first object.

20 Claims, 32 Drawing Sheets

(51) Int. Cl.
  *B60K 35/00* (2006.01)
  *B60W 10/04* (2006.01)
  *B60W 10/18* (2012.01)
  *B60W 10/20* (2006.01)
  *G01C 21/00* (2006.01)
  *B60W 40/08* (2012.01)
  *G01C 21/32* (2006.01)

(52) U.S. Cl.
  CPC ............ *B60W 10/20* (2013.01); *B60W 40/08* (2013.01); *G01C 21/32* (2013.01); *G01C 21/3833* (2020.08); *B60K 2370/1529* (2019.05); *B60K 2370/188* (2019.05); *B60K 2370/191* (2019.05); *B60K 2370/193* (2019.05); *B60W 2050/146* (2013.01); *B60W 2420/42* (2013.01); *B60W 2520/00* (2013.01); *B60W 2540/225* (2020.02); *B60W 2554/80* (2020.02)

(58) Field of Classification Search
  CPC .. G01C 21/32; G01C 21/365; G01C 21/3679; G01C 21/3697; G01C 21/3833
  See application file for complete search history.

(56) References Cited

U.S. PATENT DOCUMENTS

| | | | |
|---|---|---|---|
| 8,994,520 B2* | 3/2015 | Stahlin | B60Q 9/008 340/436 |
| 9,349,057 B2* | 5/2016 | Tsuchiya | G08G 1/166 |
| 9,409,519 B2* | 8/2016 | Sisbot | B60R 1/001 |
| 9,767,693 B2* | 9/2017 | Lee | G08G 1/0962 |
| 9,783,166 B1* | 10/2017 | Brown | B60S 1/485 |
| 9,802,622 B2* | 10/2017 | Park | B60K 35/00 |
| 10,011,285 B2* | 7/2018 | McNew | B60R 11/0229 |
| 10,071,747 B2* | 9/2018 | Roth | G08G 1/00 |
| 10,093,233 B2* | 10/2018 | Krokel | G06T 7/75 |
| 10,497,264 B2* | 12/2019 | Rowell | G08G 1/166 |
| 10,620,435 B2* | 4/2020 | Thieberger | B60R 21/06 |
| 2001/0012976 A1* | 8/2001 | Menig | B60K 35/00 701/1 |
| 2003/0142041 A1* | 7/2003 | Barlow | G06K 9/0061 345/8 |
| 2006/0055525 A1* | 3/2006 | Kubota | G08G 1/0962 340/461 |
| 2009/0256813 A1* | 10/2009 | Amici | B60K 35/00 345/173 |
| 2013/0181823 A1 | 7/2013 | Stählin et al. | |
| 2015/0331238 A1 | 11/2015 | Roth et al. | |
| 2017/0334459 A1* | 11/2017 | Mcnew | B60W 50/14 |

FOREIGN PATENT DOCUMENTS

| | | |
|---|---|---|
| JP | 2014089138 | 5/2014 |
| KR | 1020150058889 | 5/2015 |
| KR | 1020150074750 | 7/2015 |
| KR | 1020150140449 | 12/2015 |
| KR | 101583950 | 1/2016 |
| WO | WO2015152304 | 4/2017 |

\* cited by examiner

[FIG. 1a]
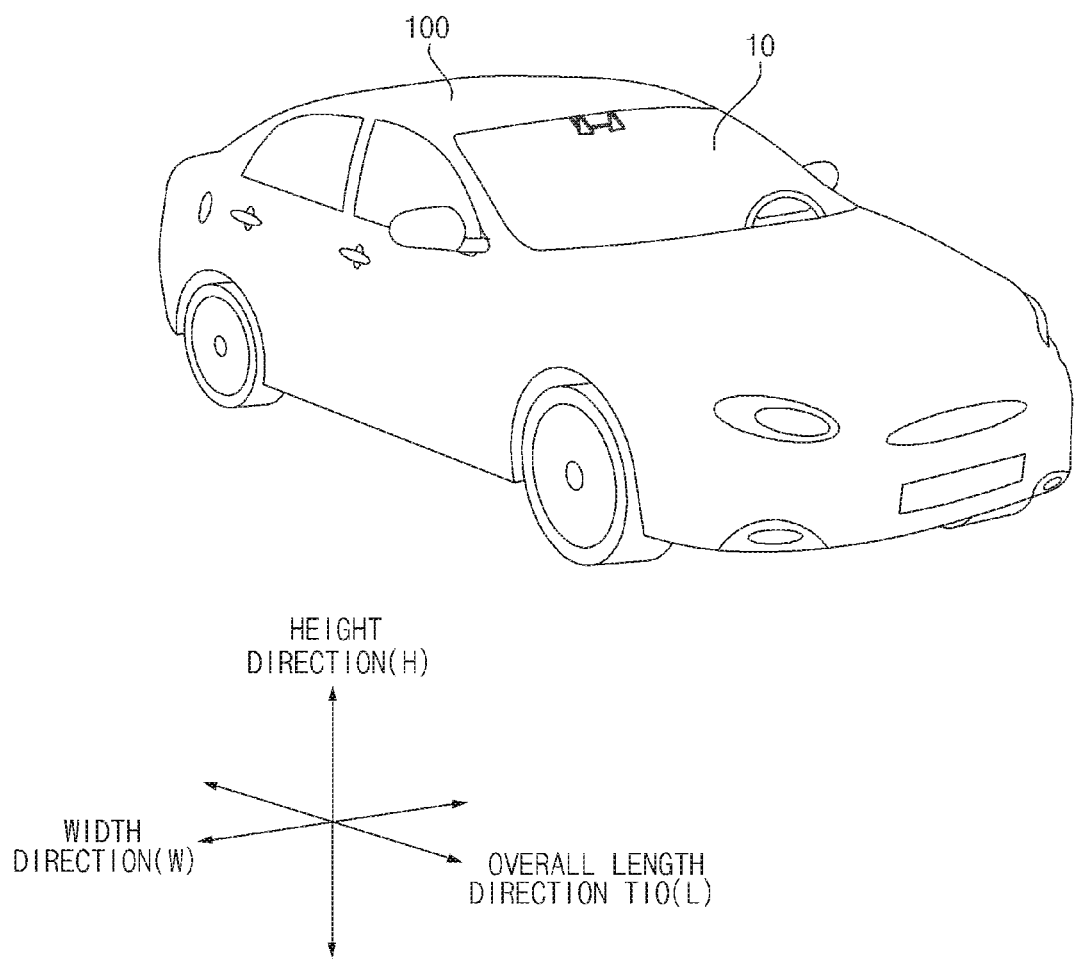

[FIG. 1b]
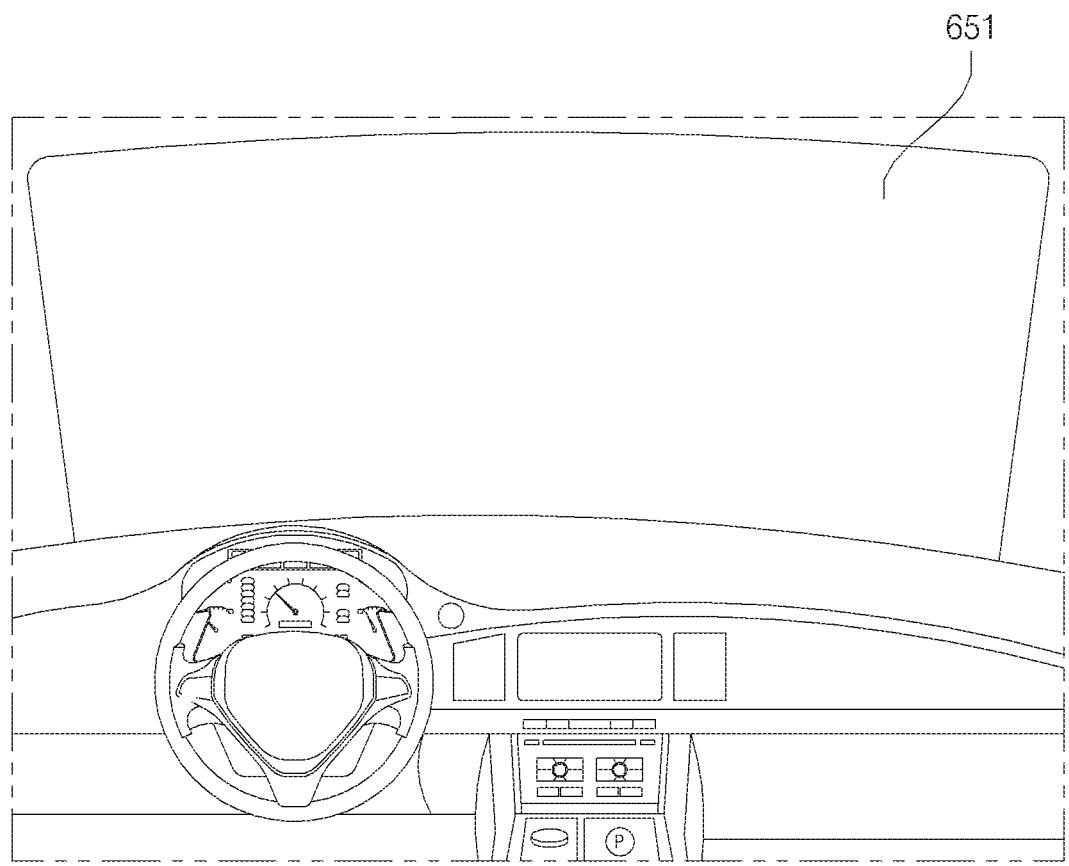

[FIG. 2]
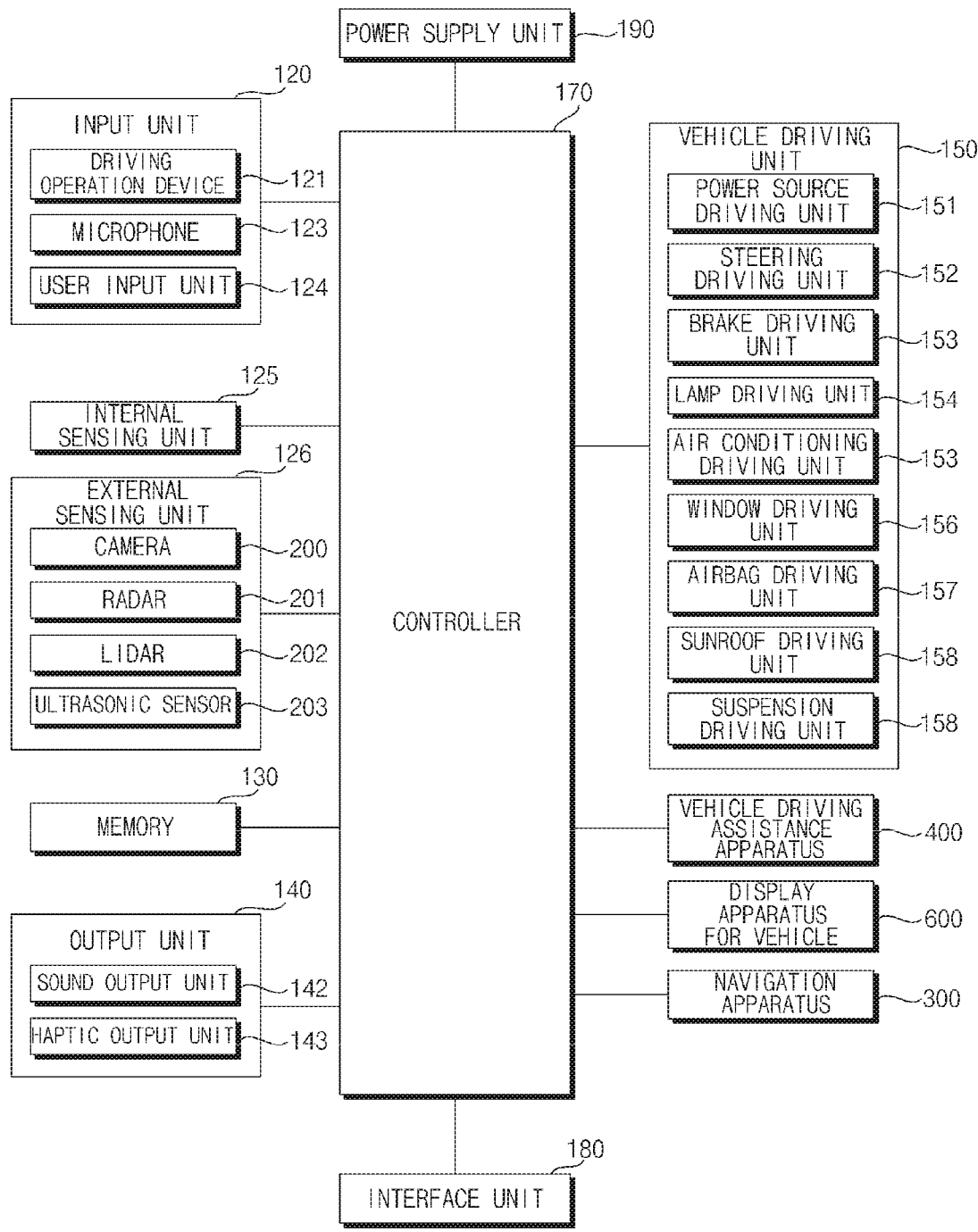

[FIG. 3a]
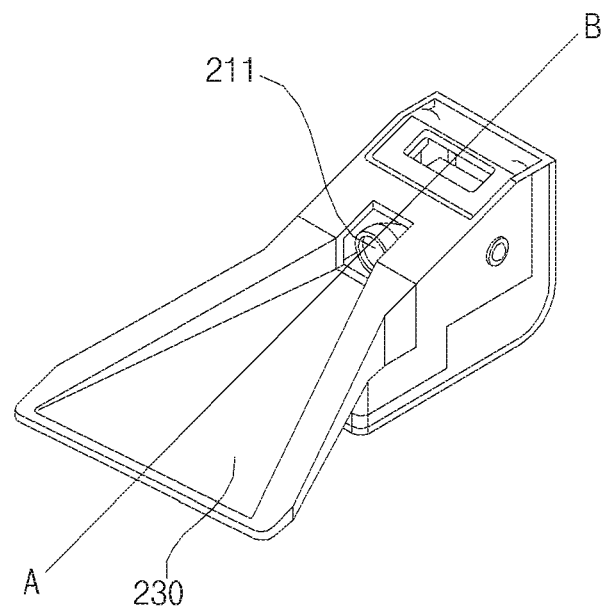

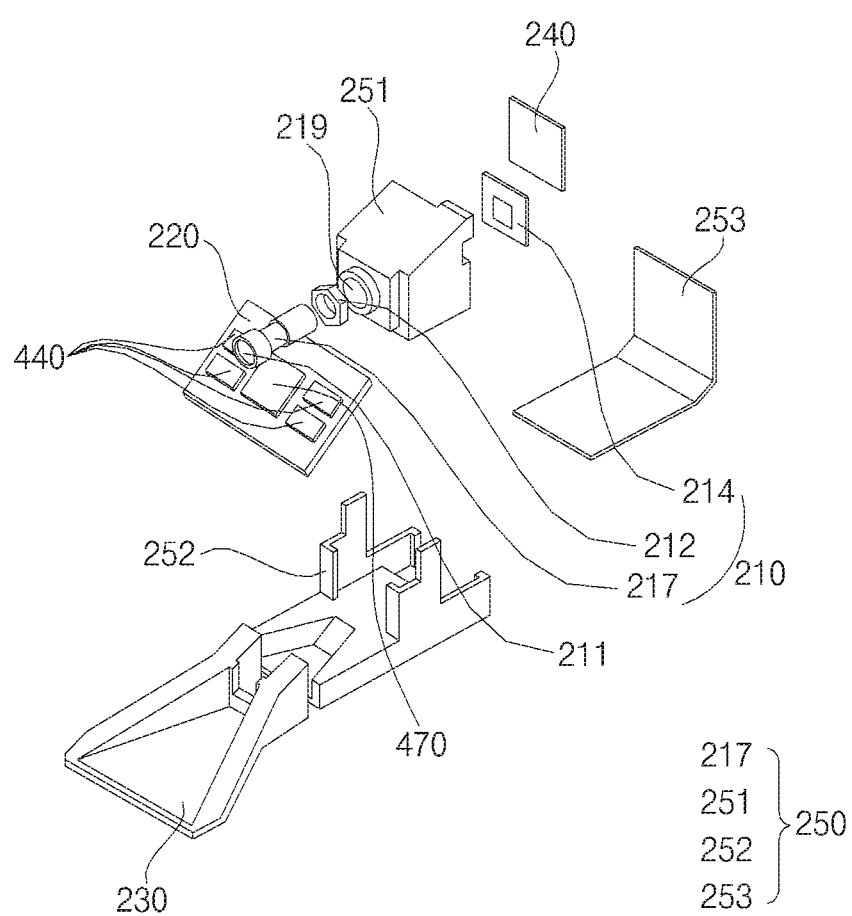
[FIG. 3b]

[FIG. 3c]
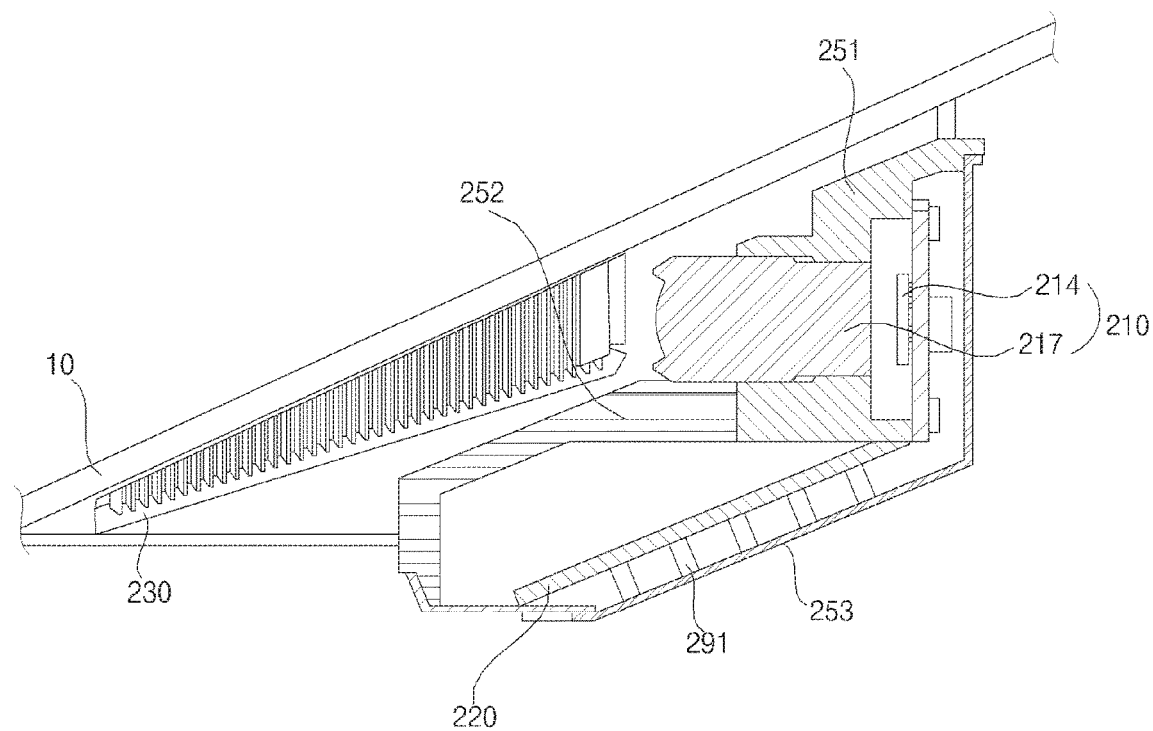

[FIG. 3d]
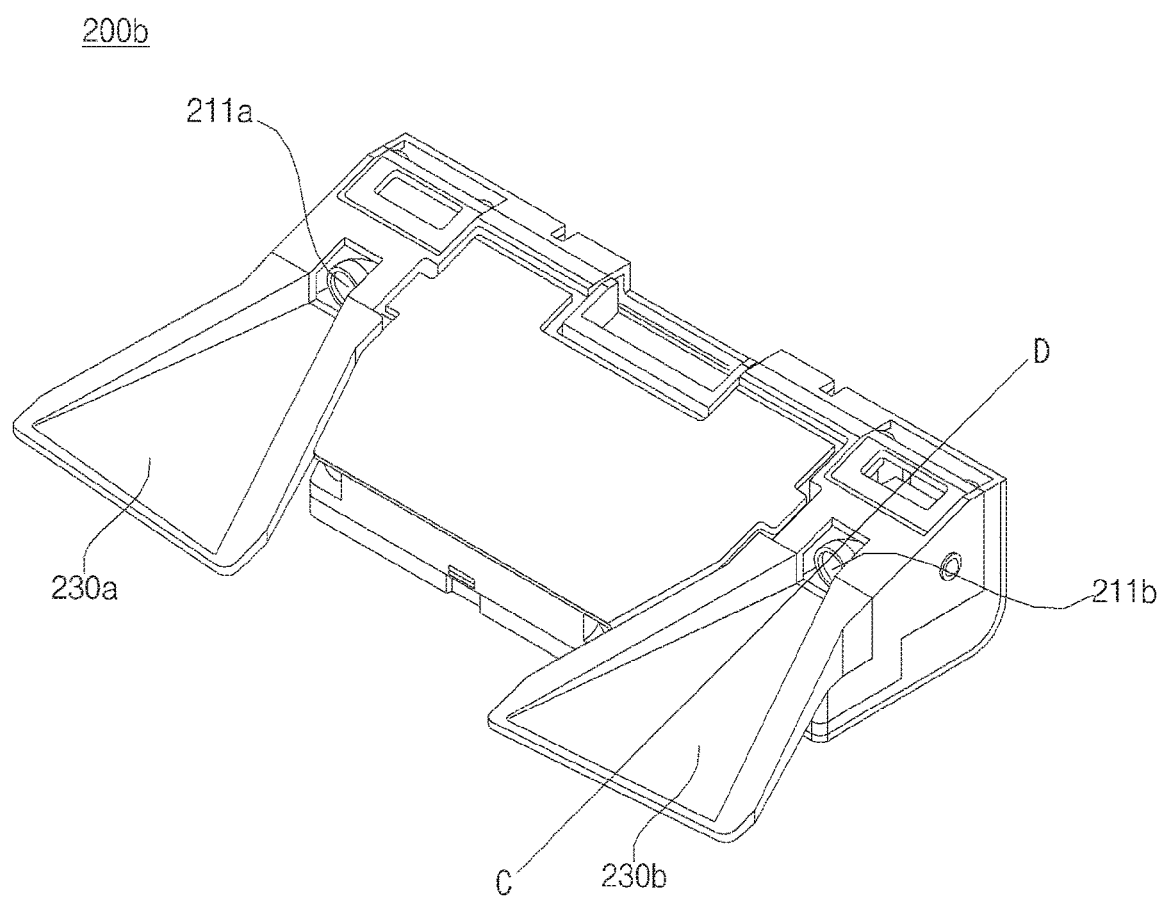

[FIG. 3e]
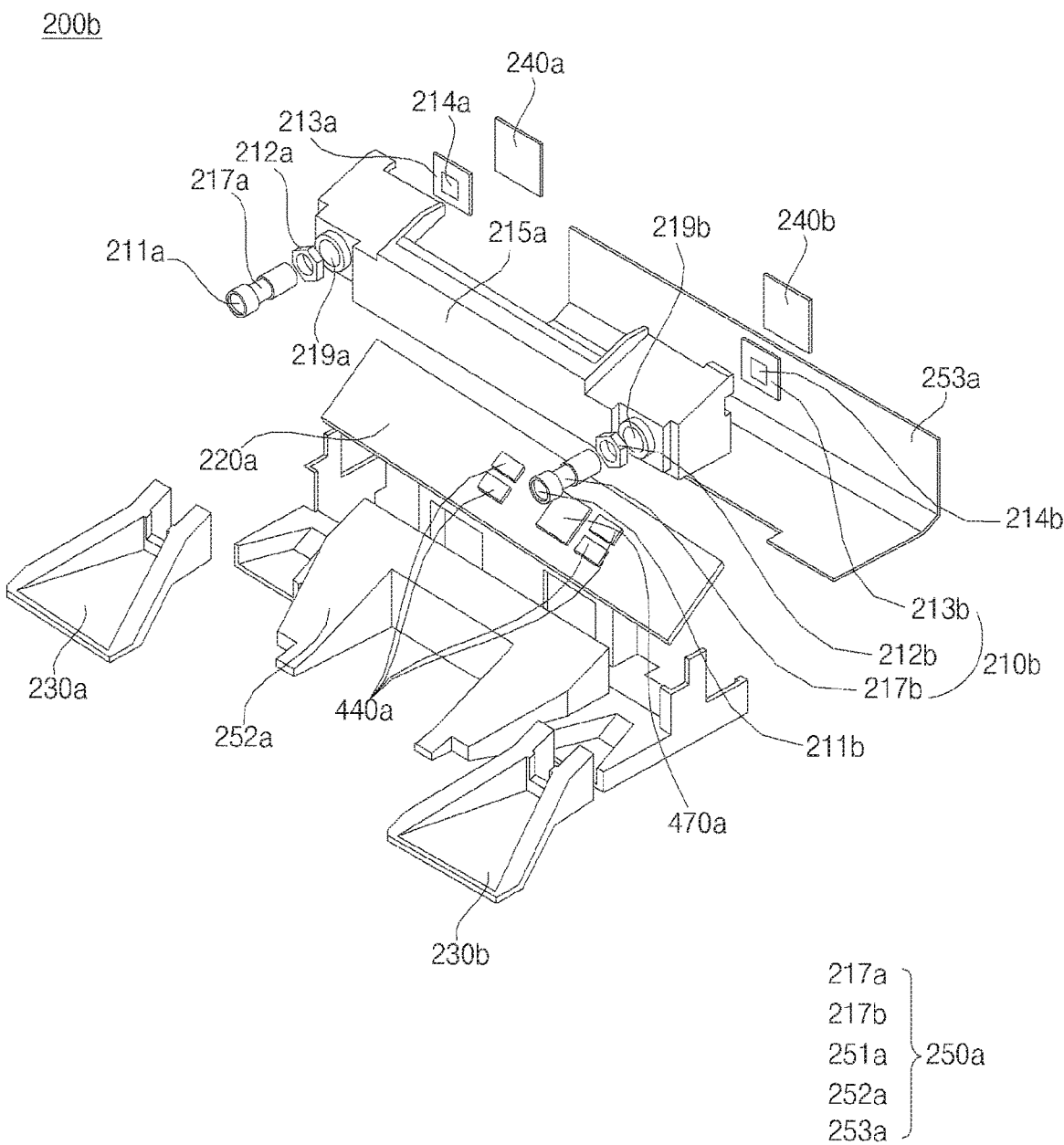

[FIG. 3f]
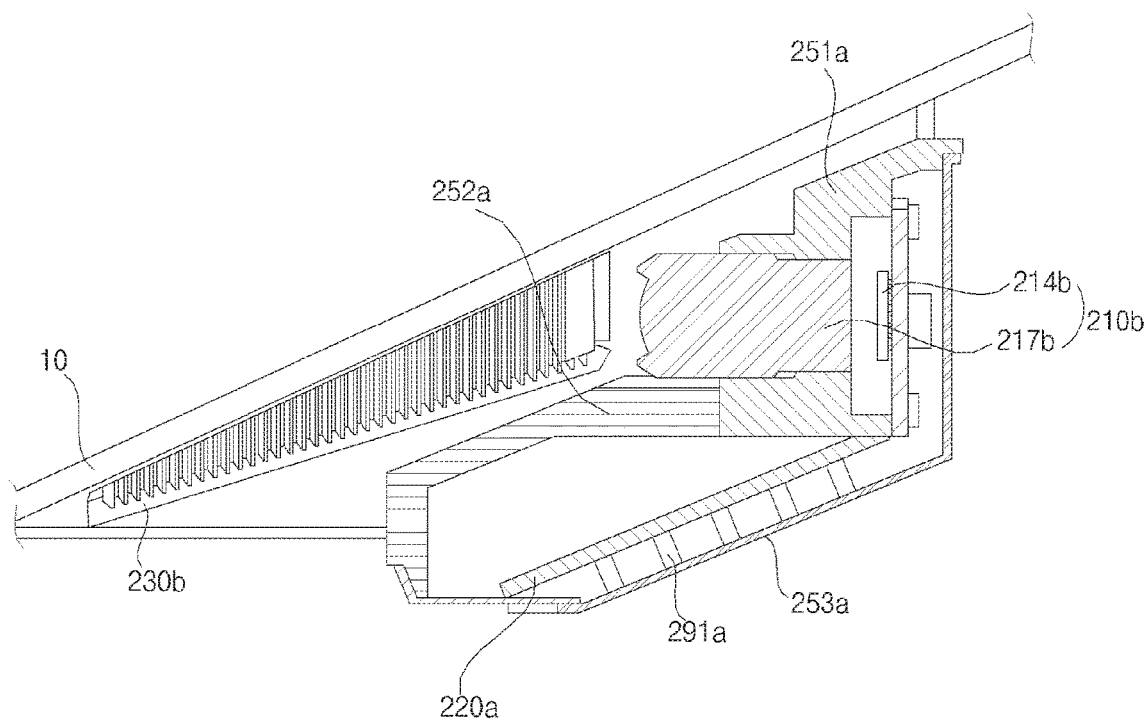

[FIG. 4a]
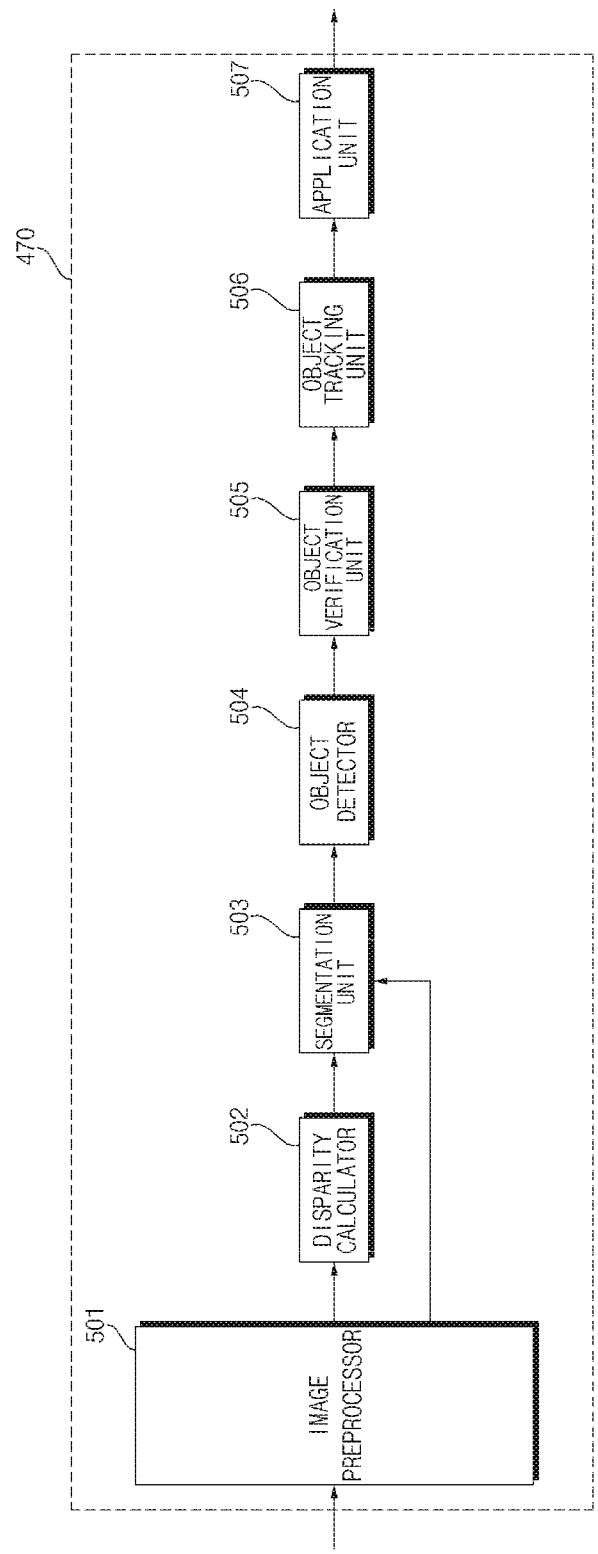

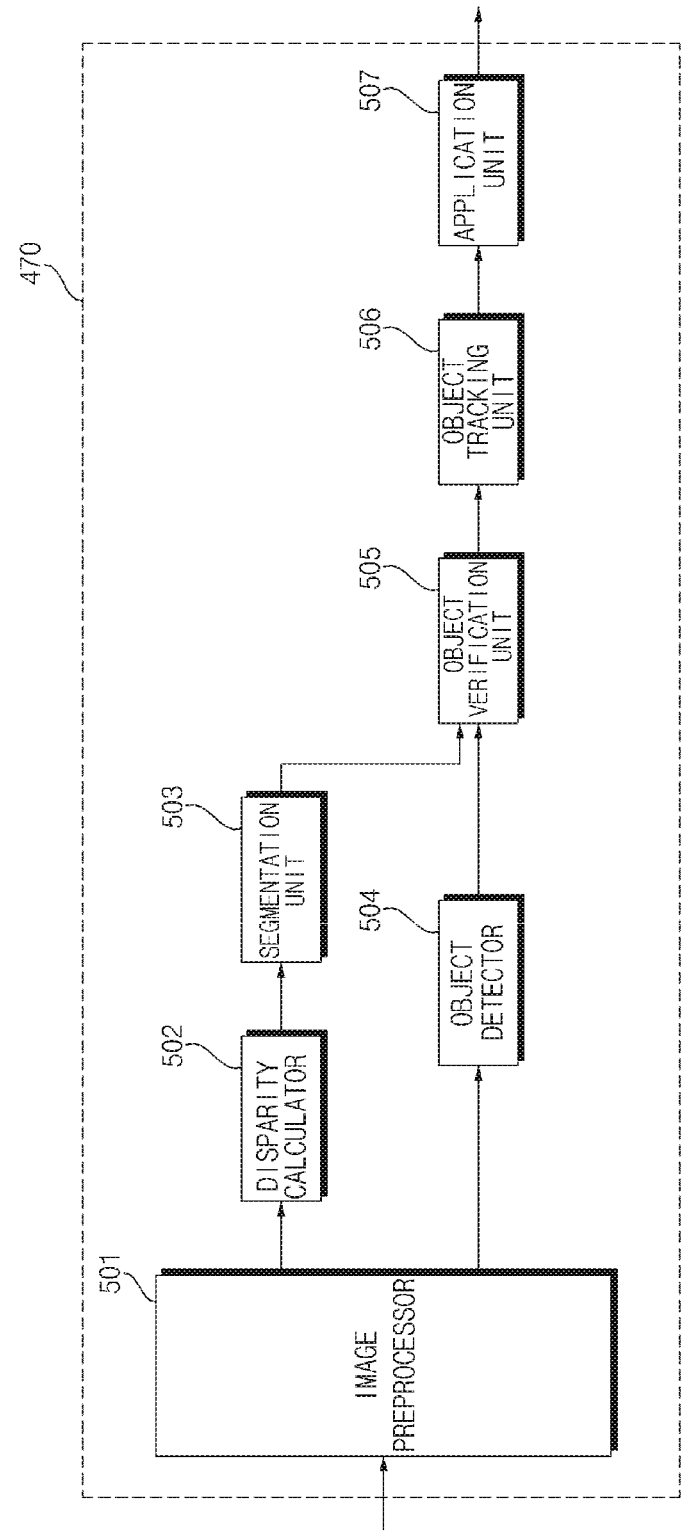
[FIG. 4b]

[FIG. 5a]
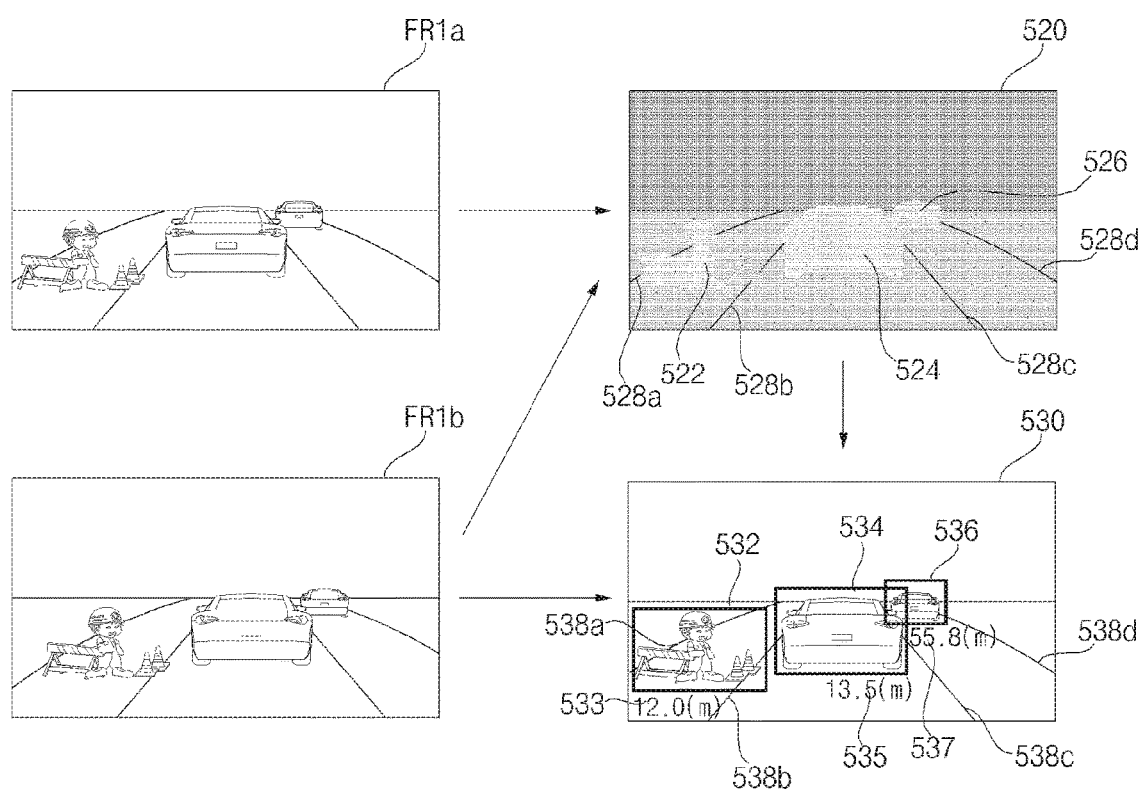

[FIG. 5b]
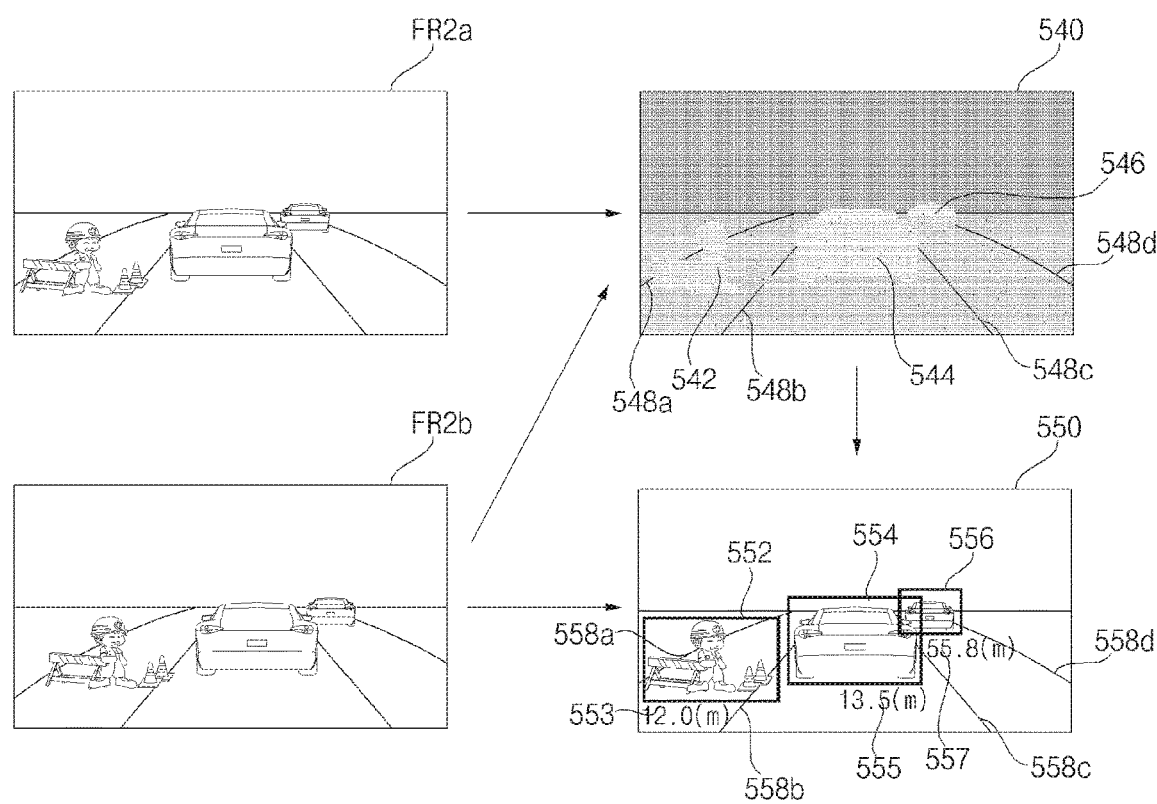

[FIG. 5c]
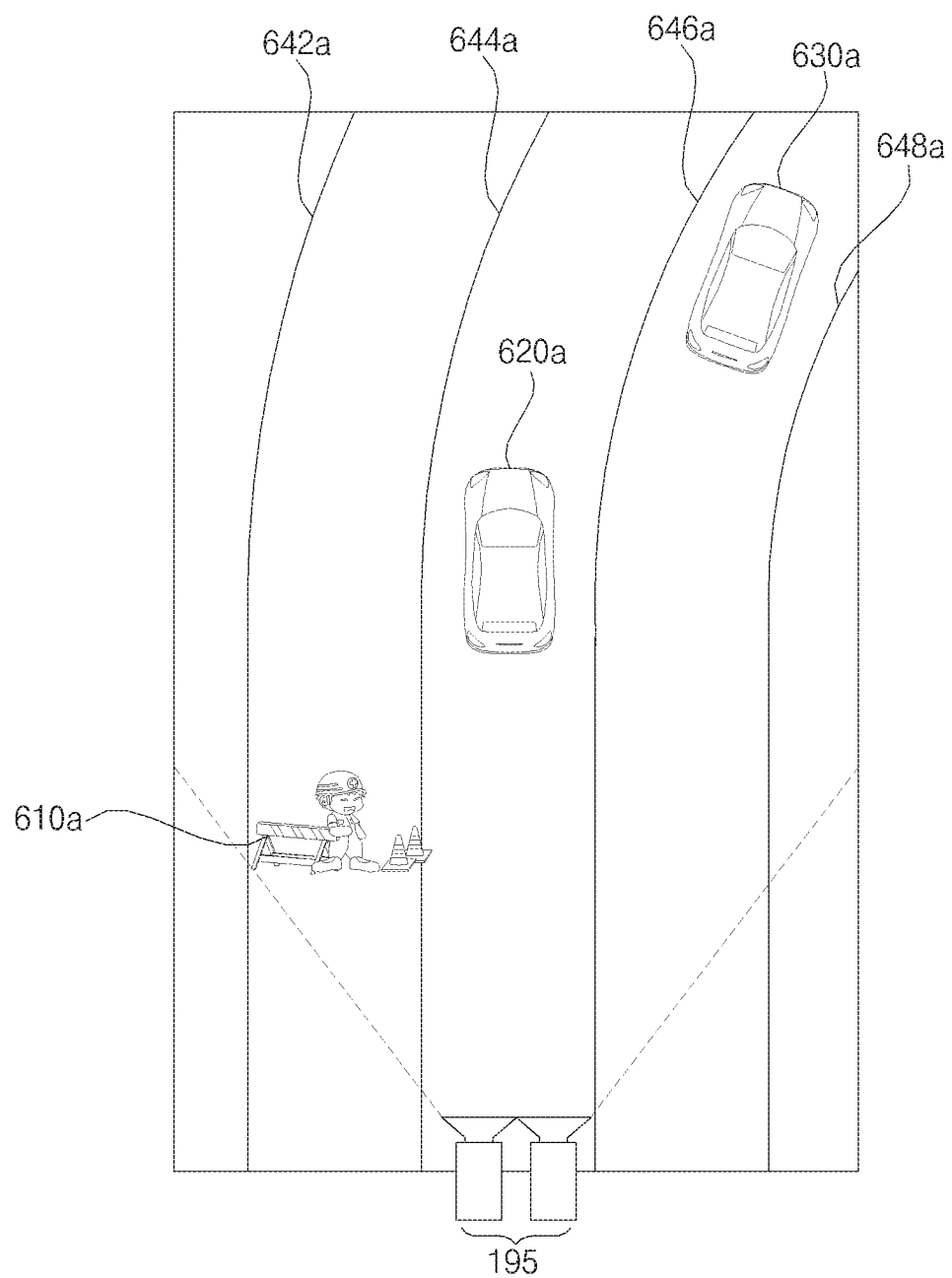

[FIG. 5d]
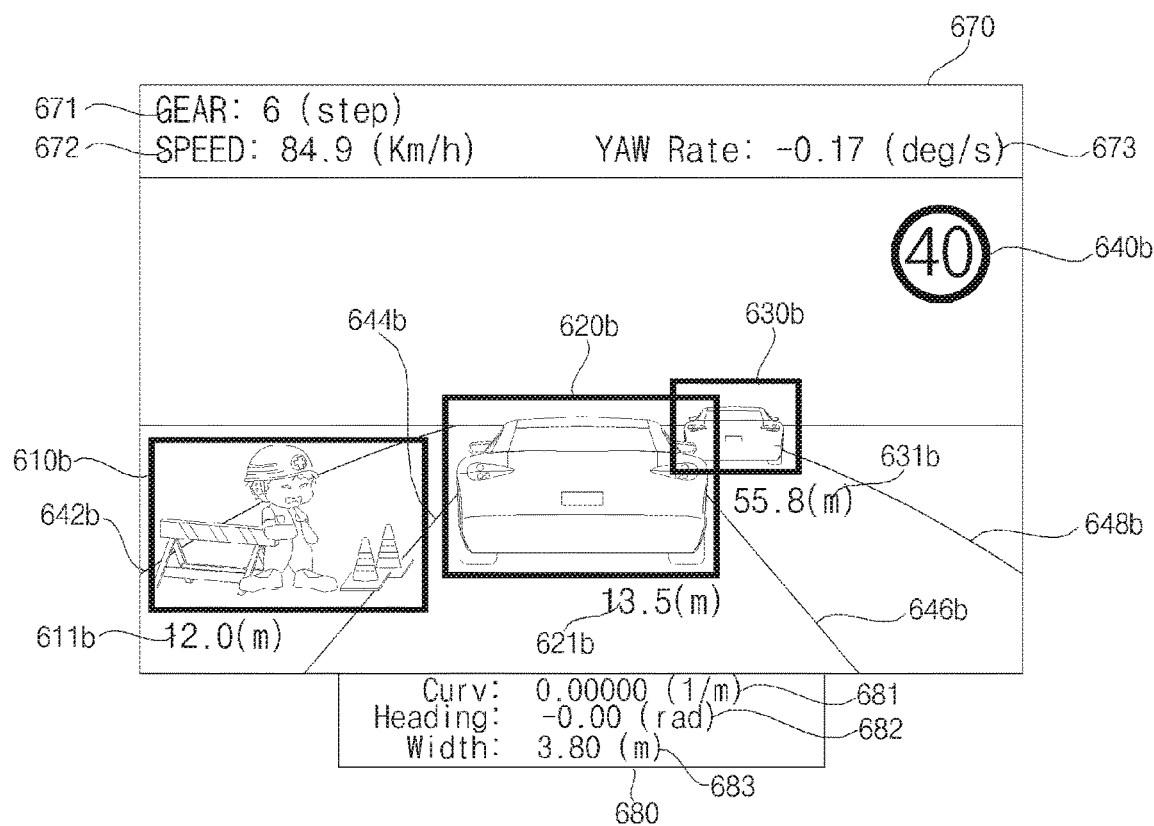

[FIG. 6]
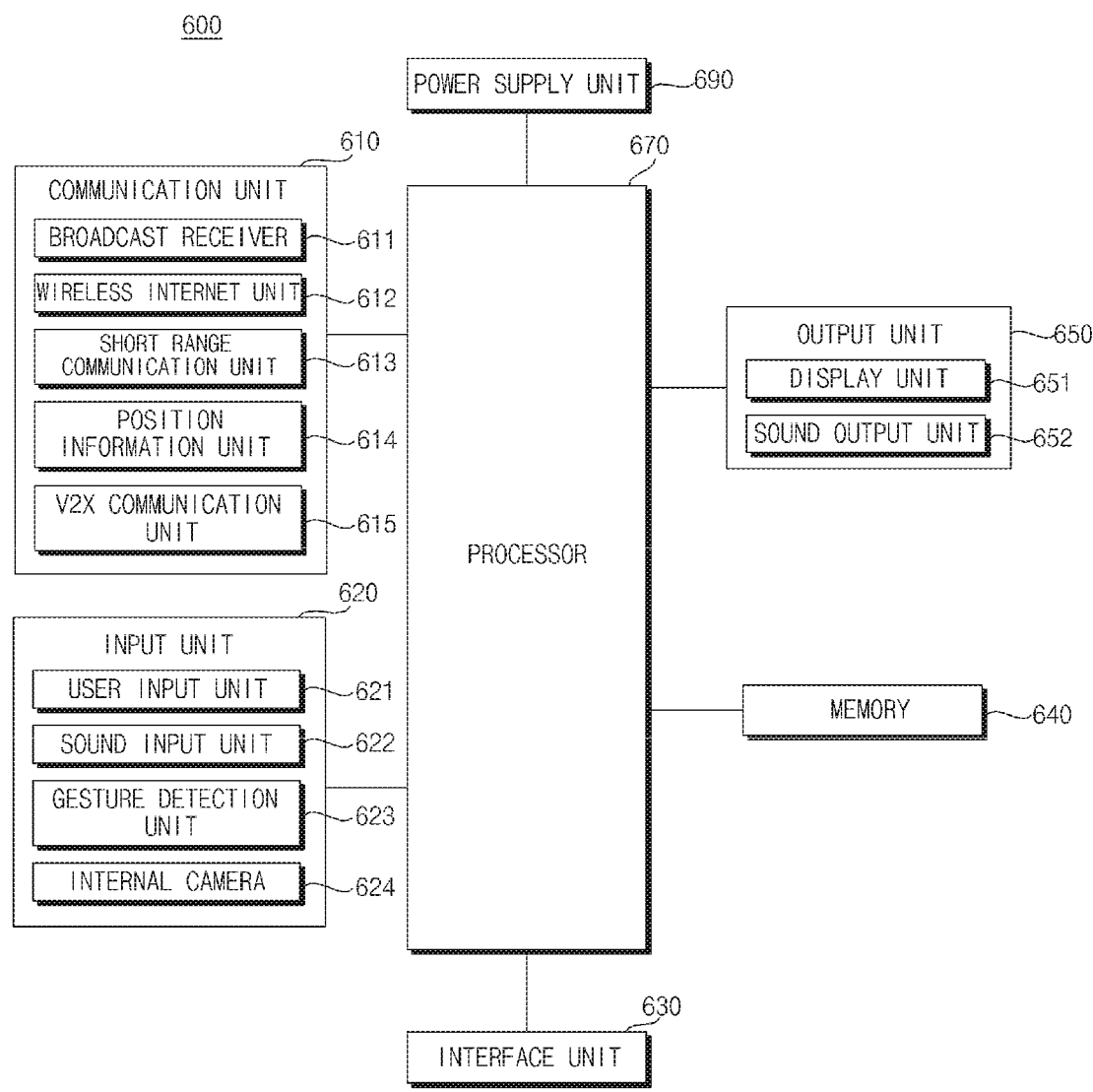

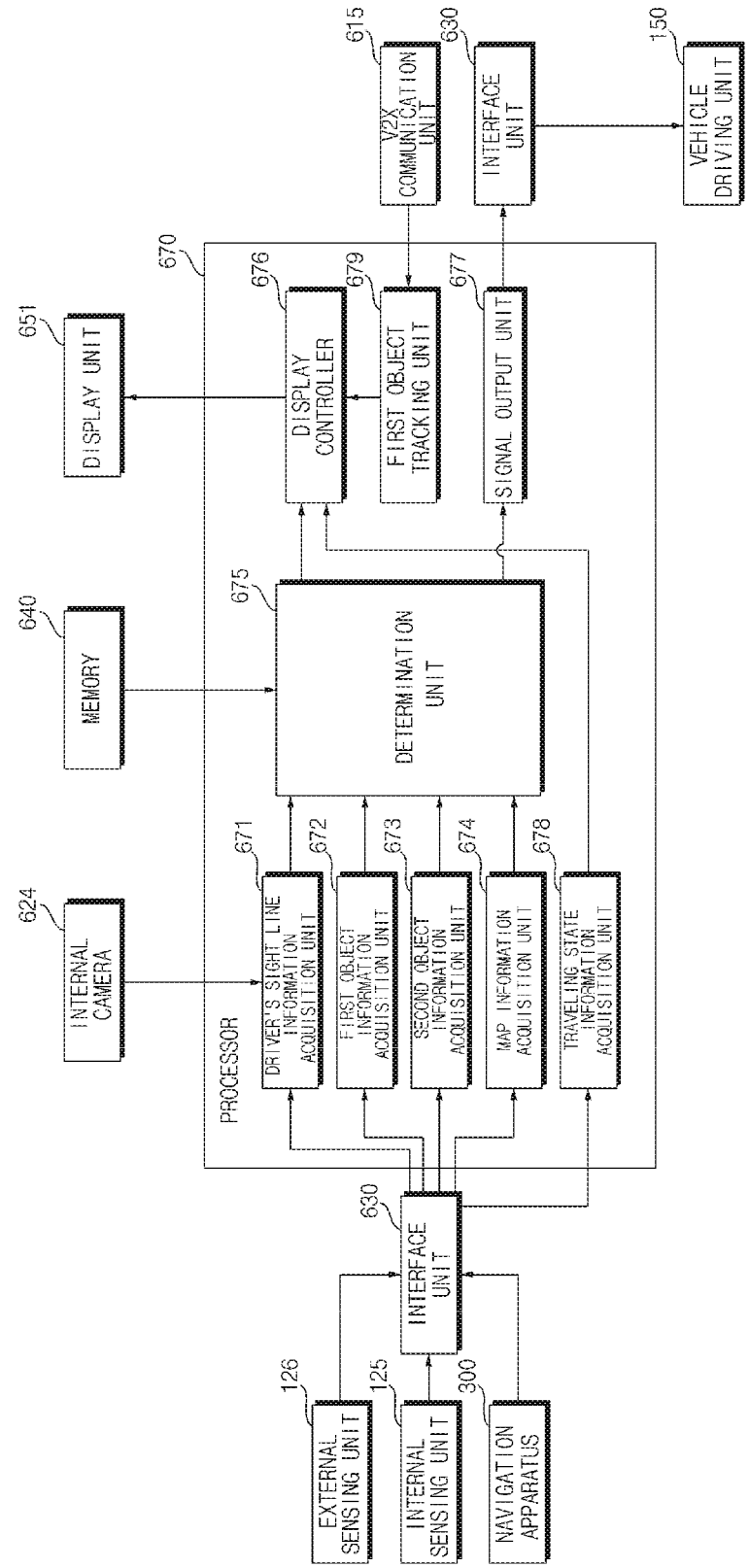
[FIG. 7]

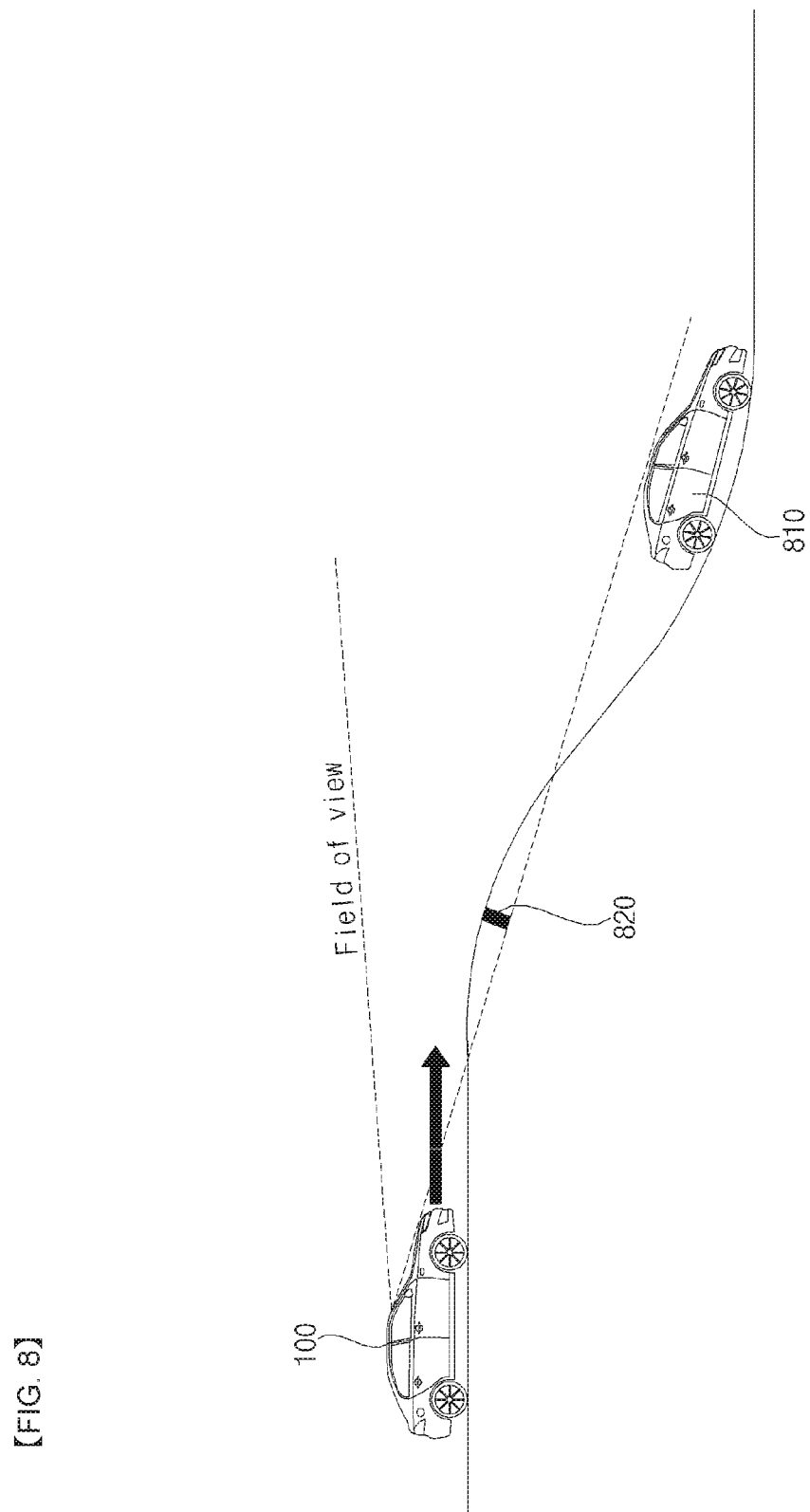
[FIG. 8]

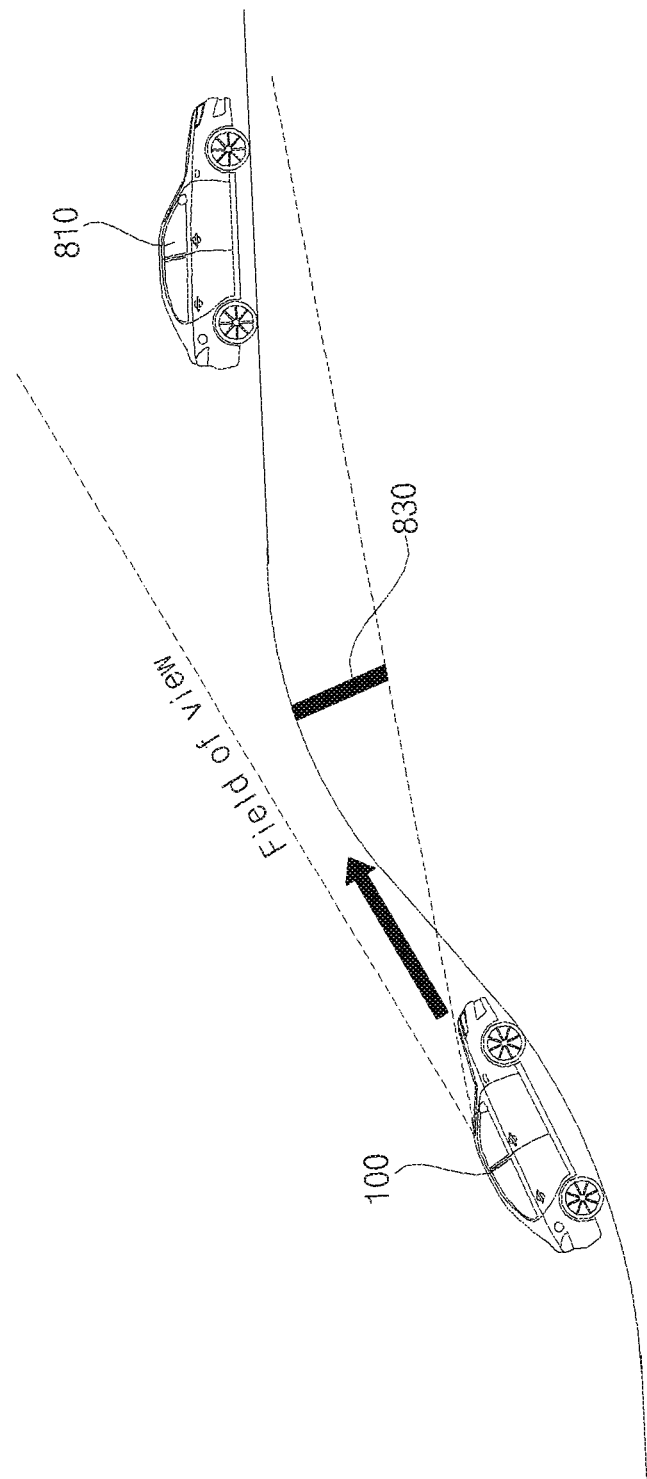

[FIG. 10a]
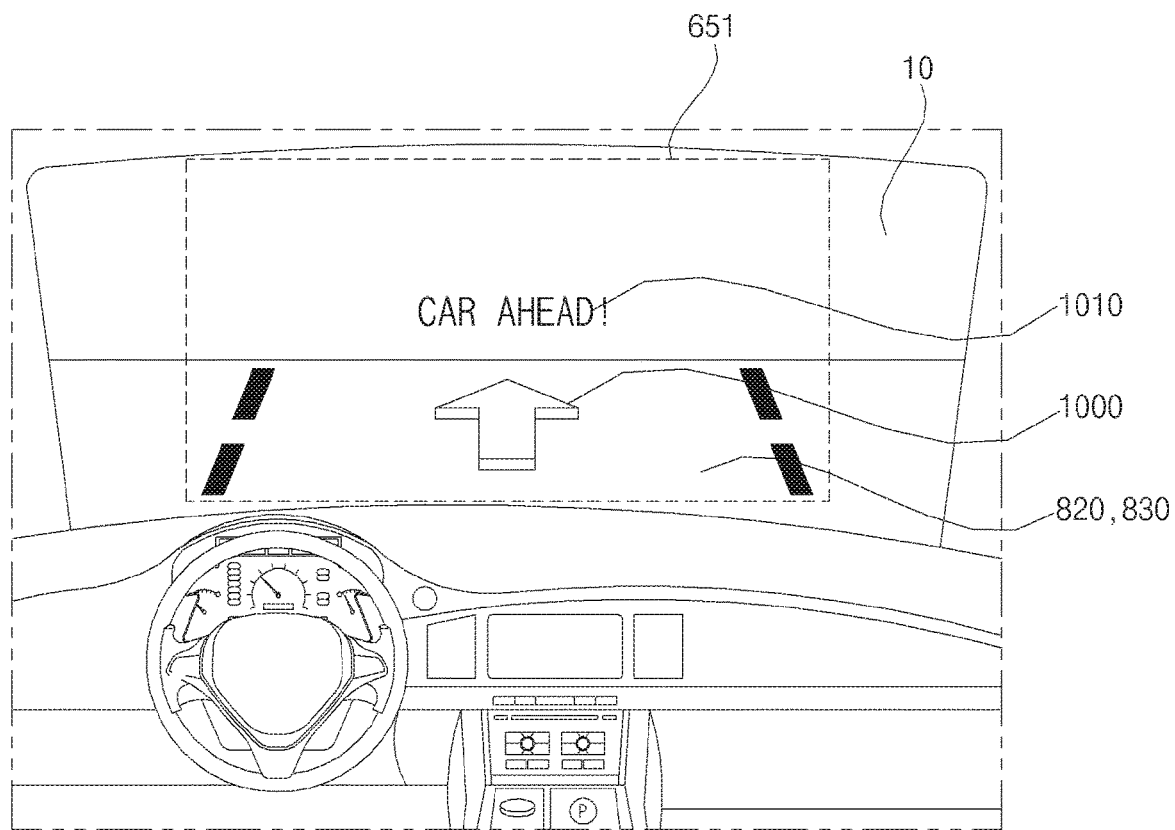

[FIG. 10b]
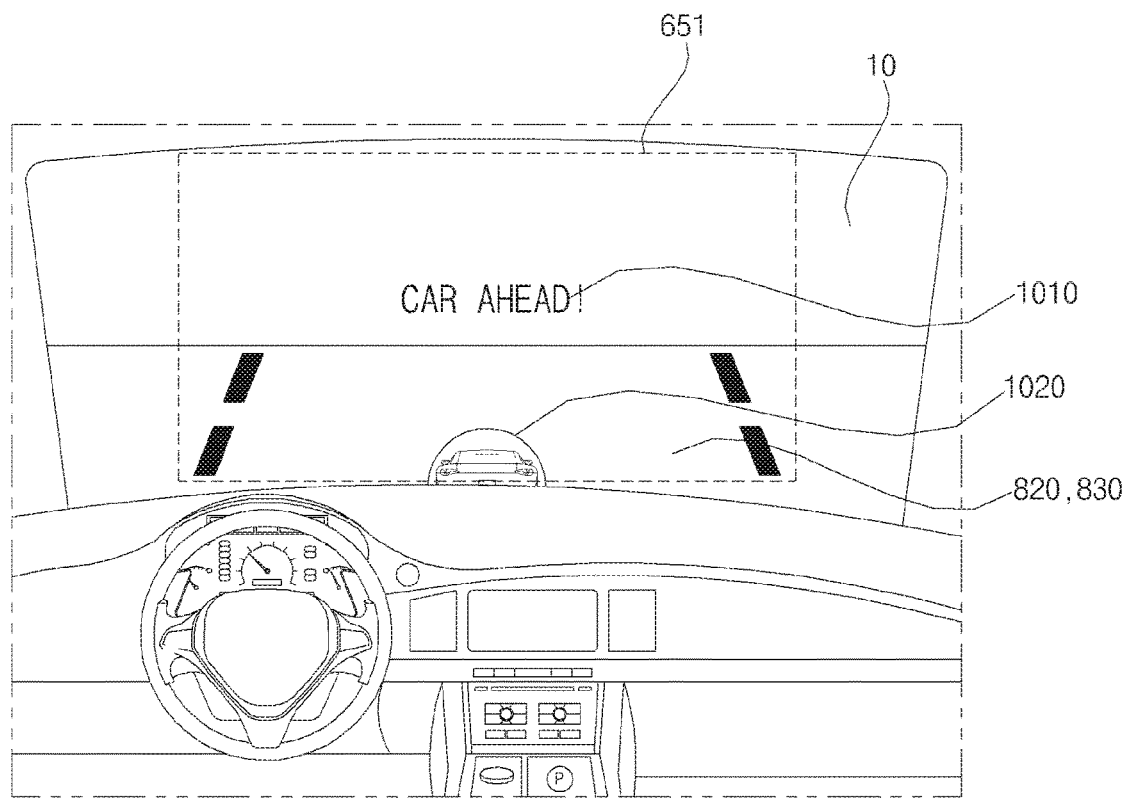

[FIG. 10c]
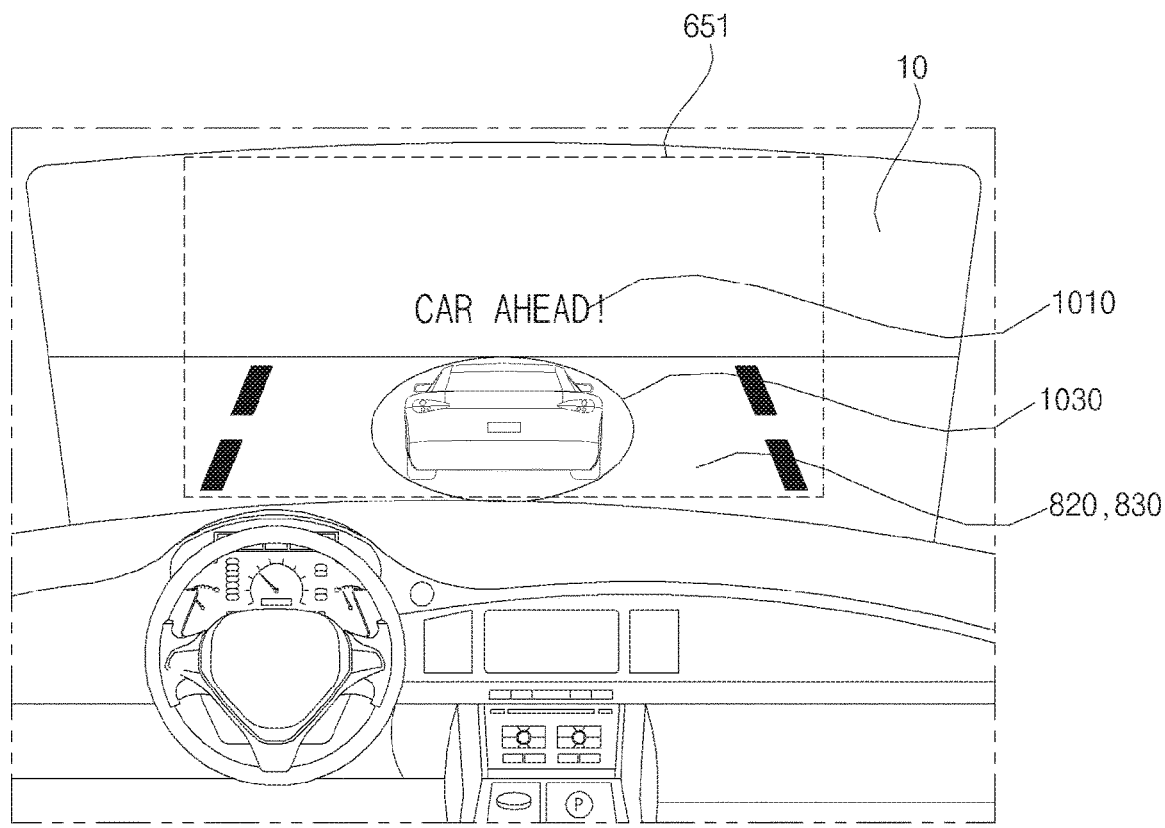

[FIG. 10d]
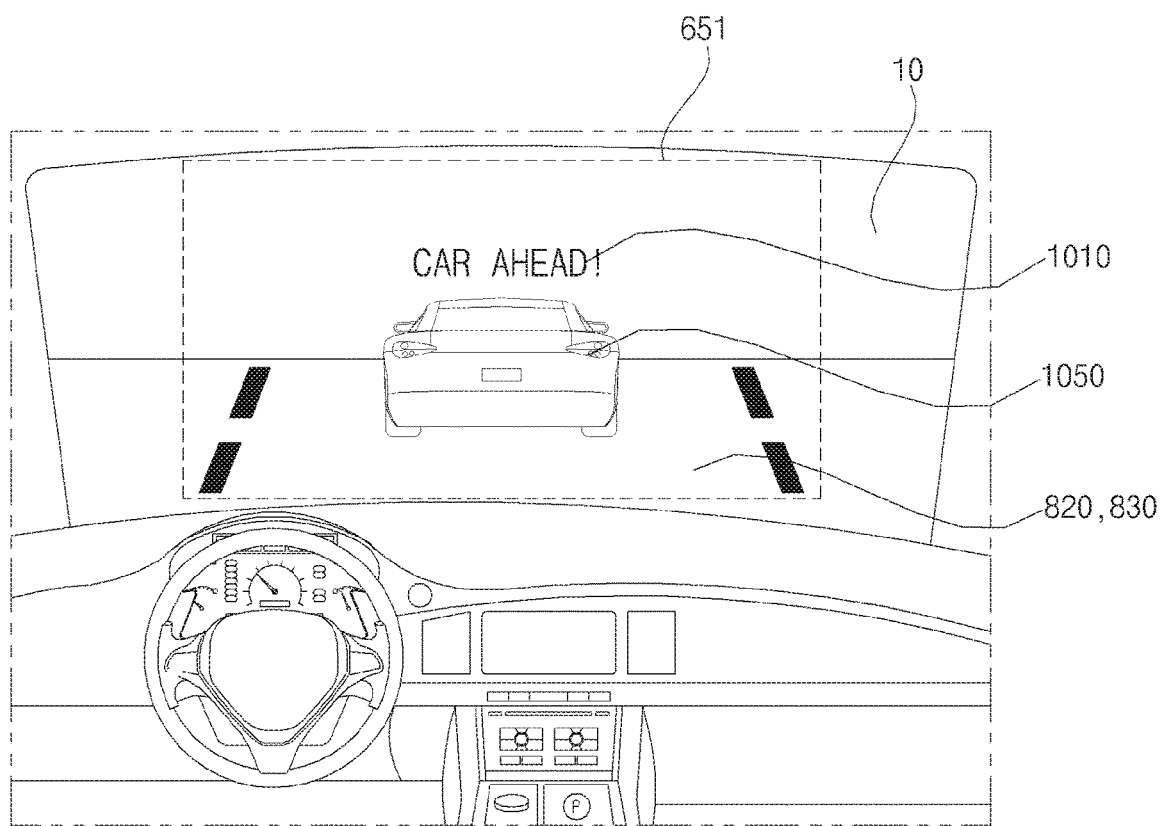

[FIG. 11]
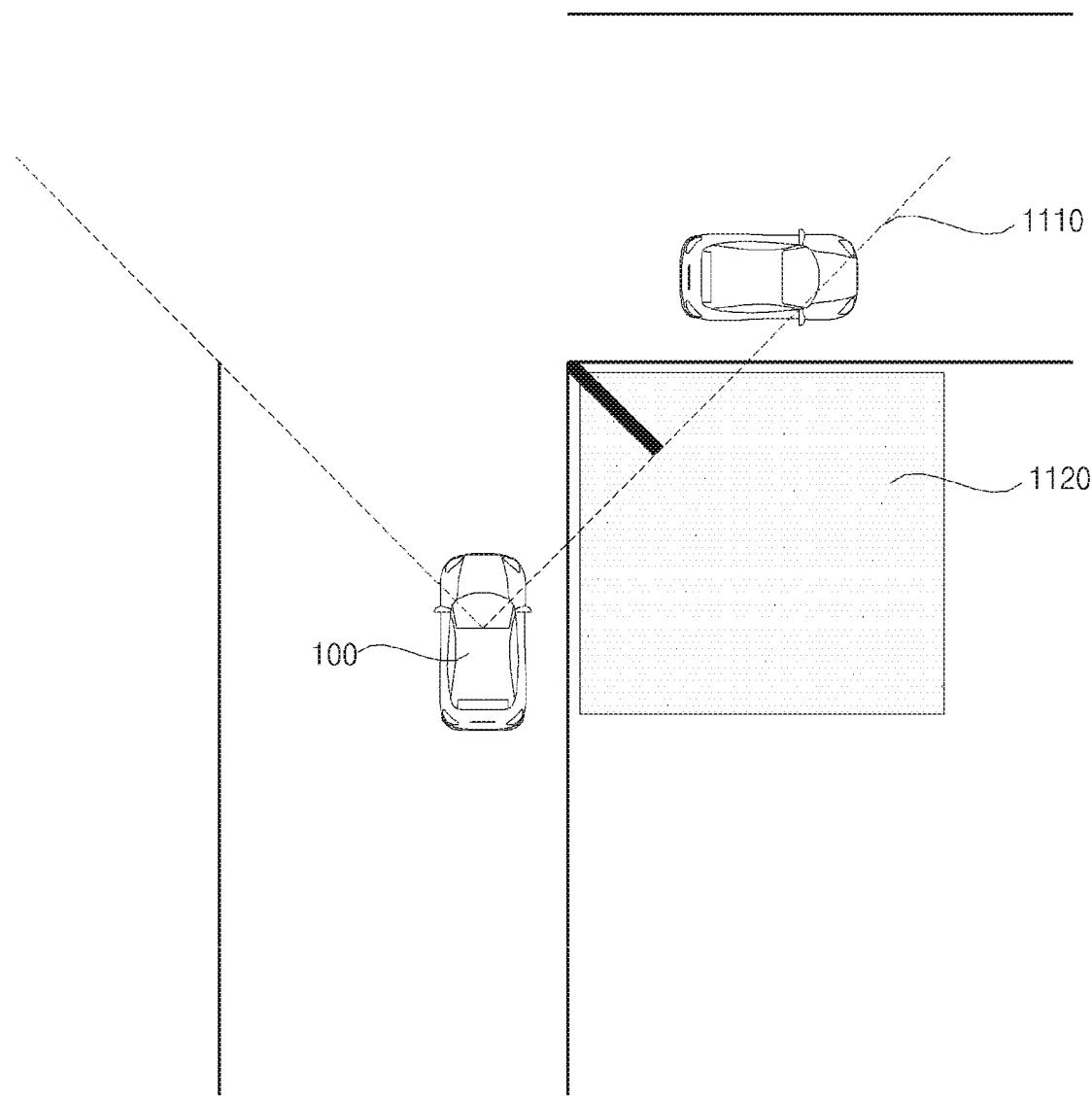

[FIG. 12]
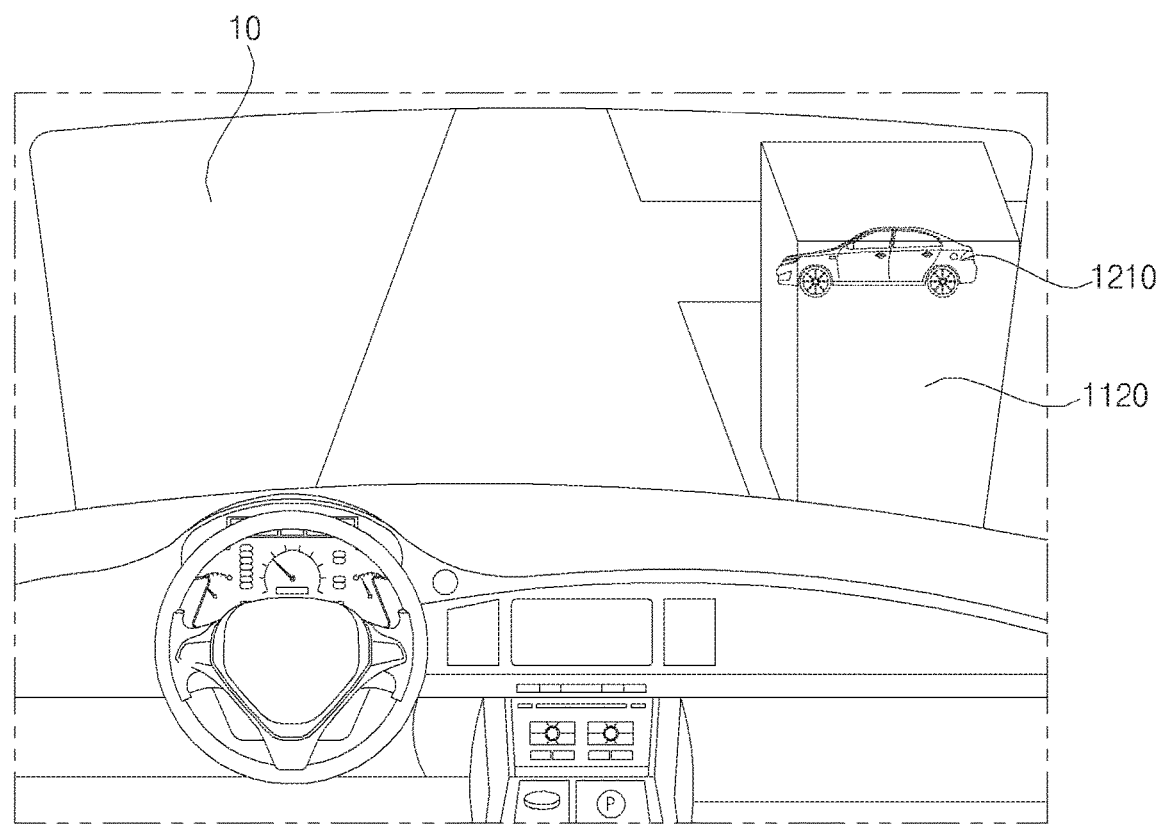

[FIG. 13]
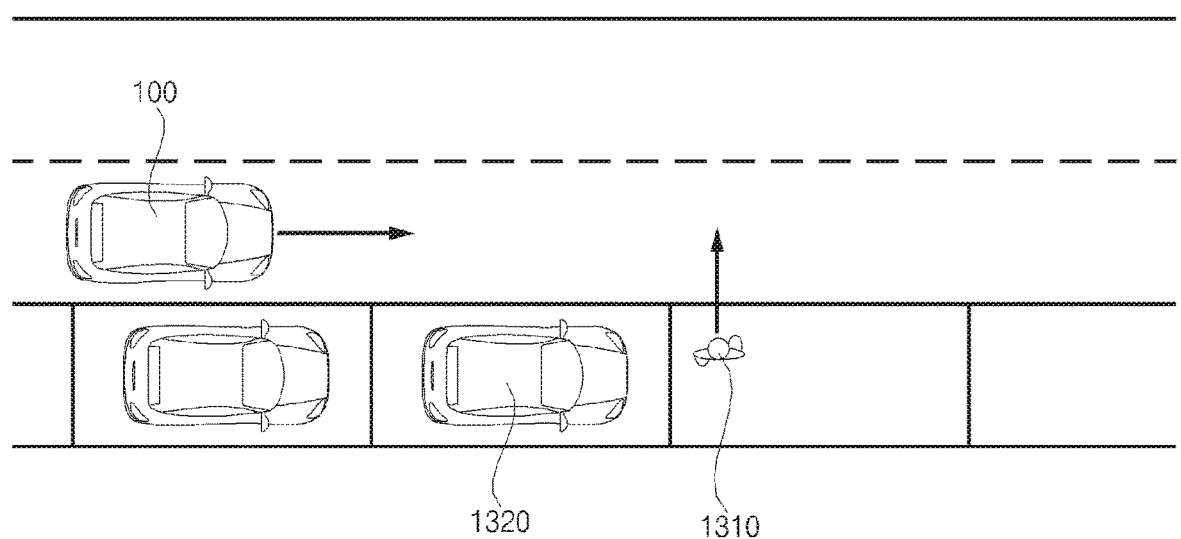

[FIG. 14]
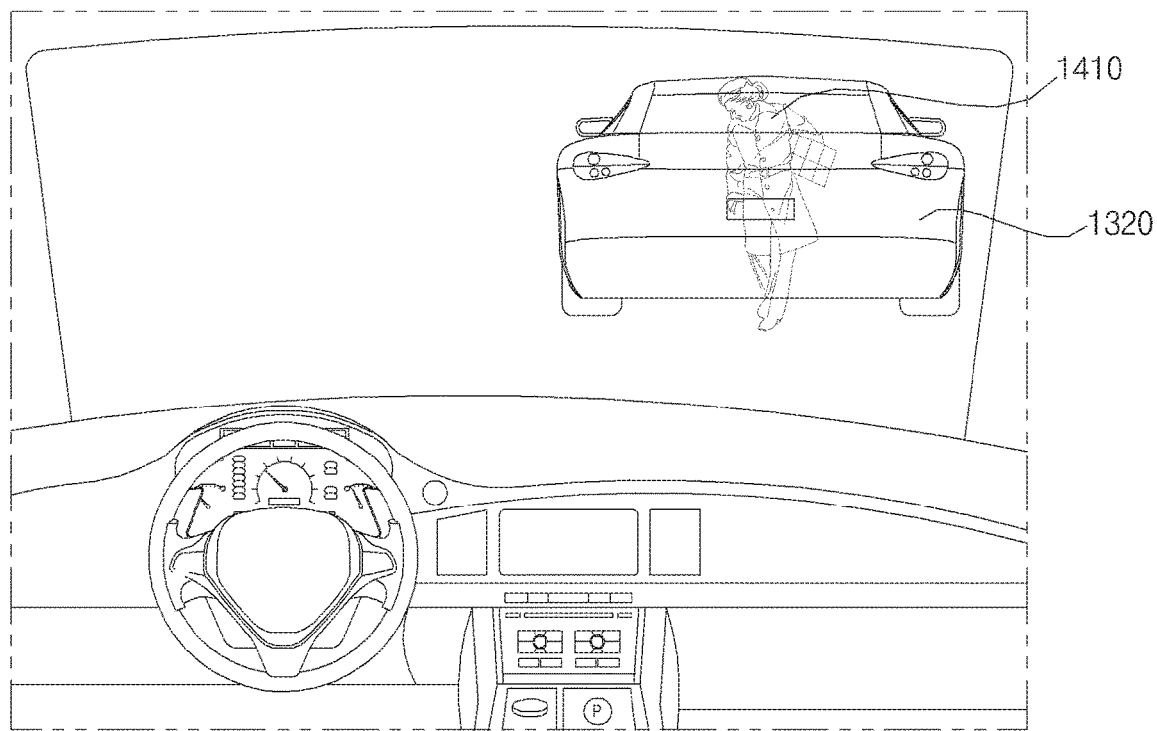

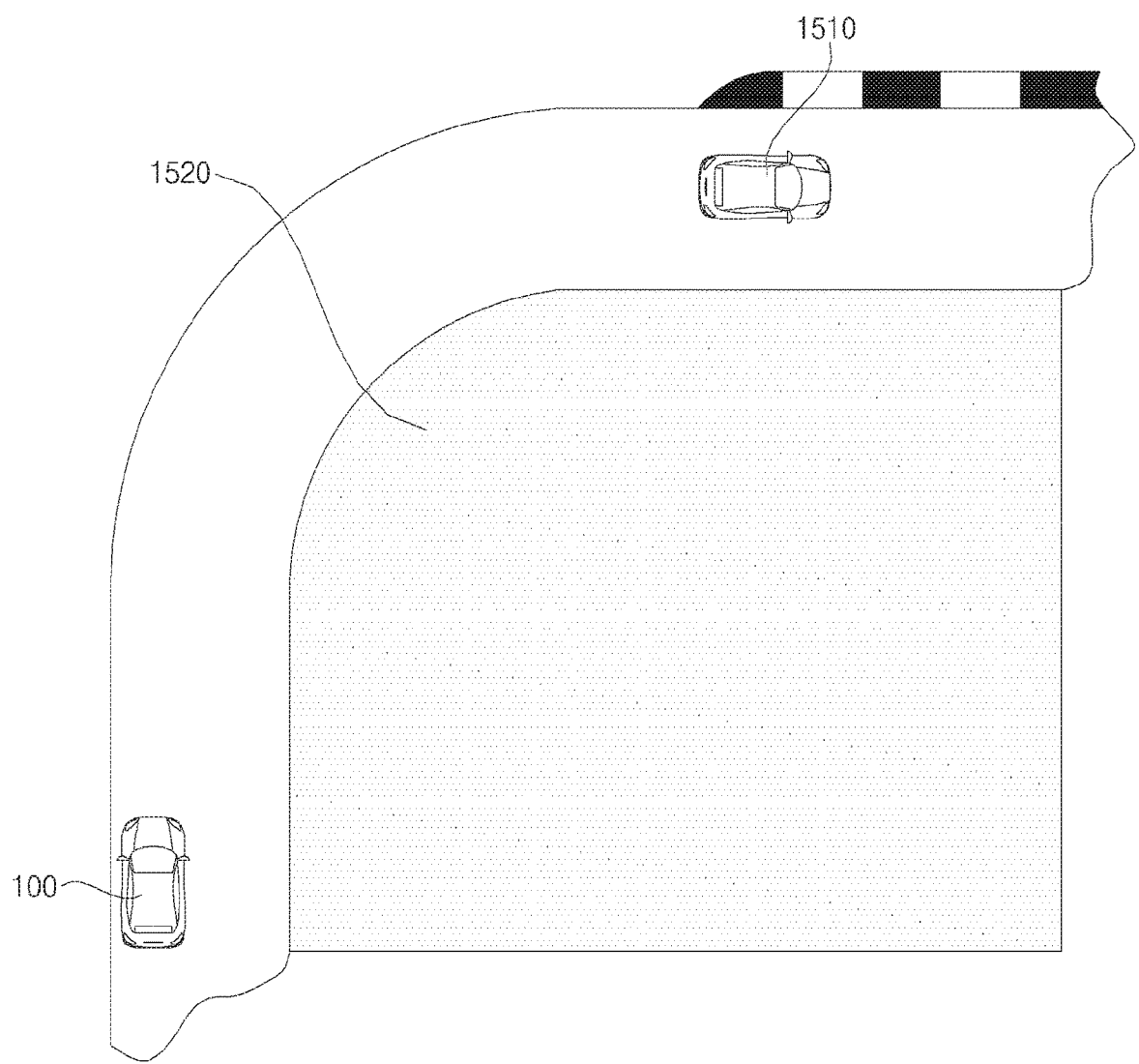
[FIG. 15]

[FIG. 16]
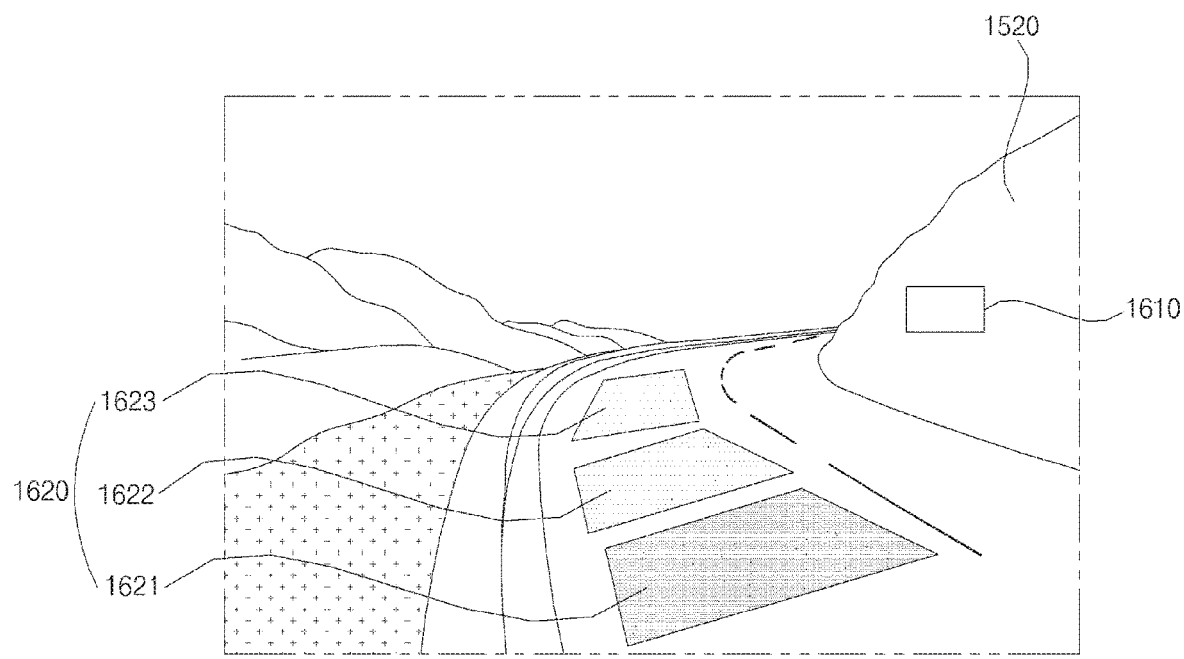

[FIG. 17]
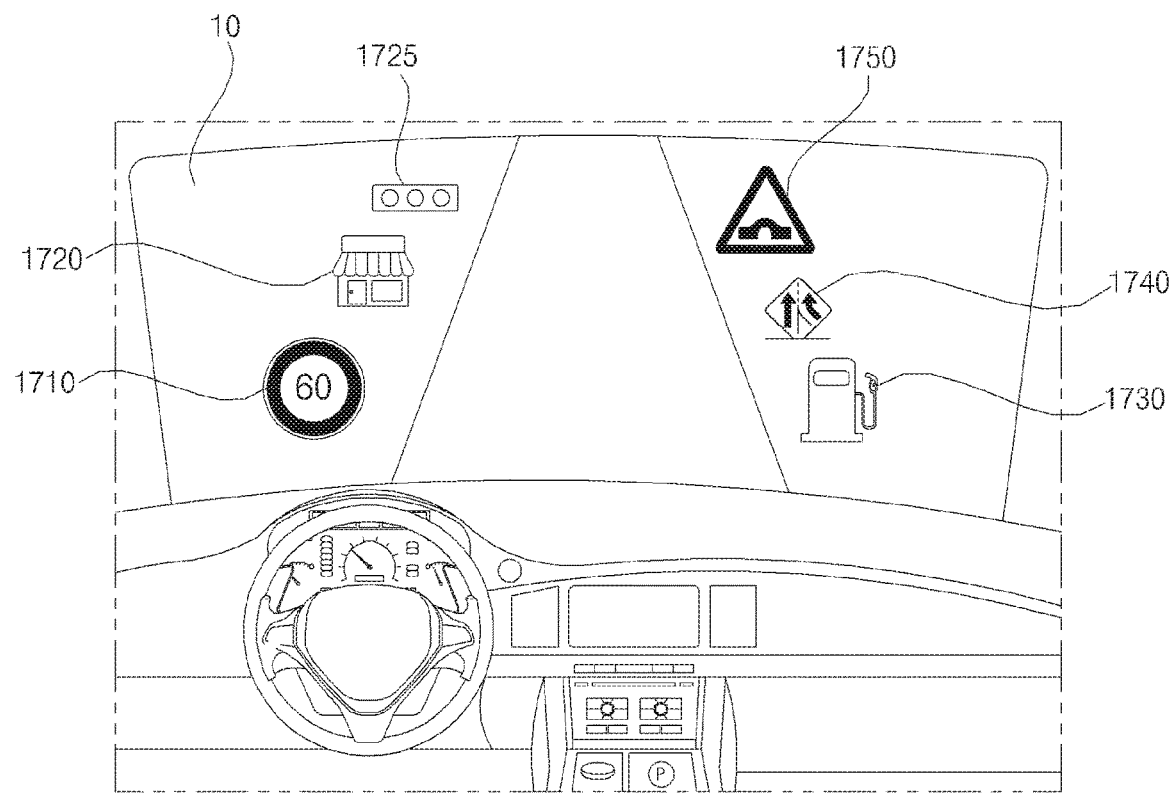

[FIG. 18]
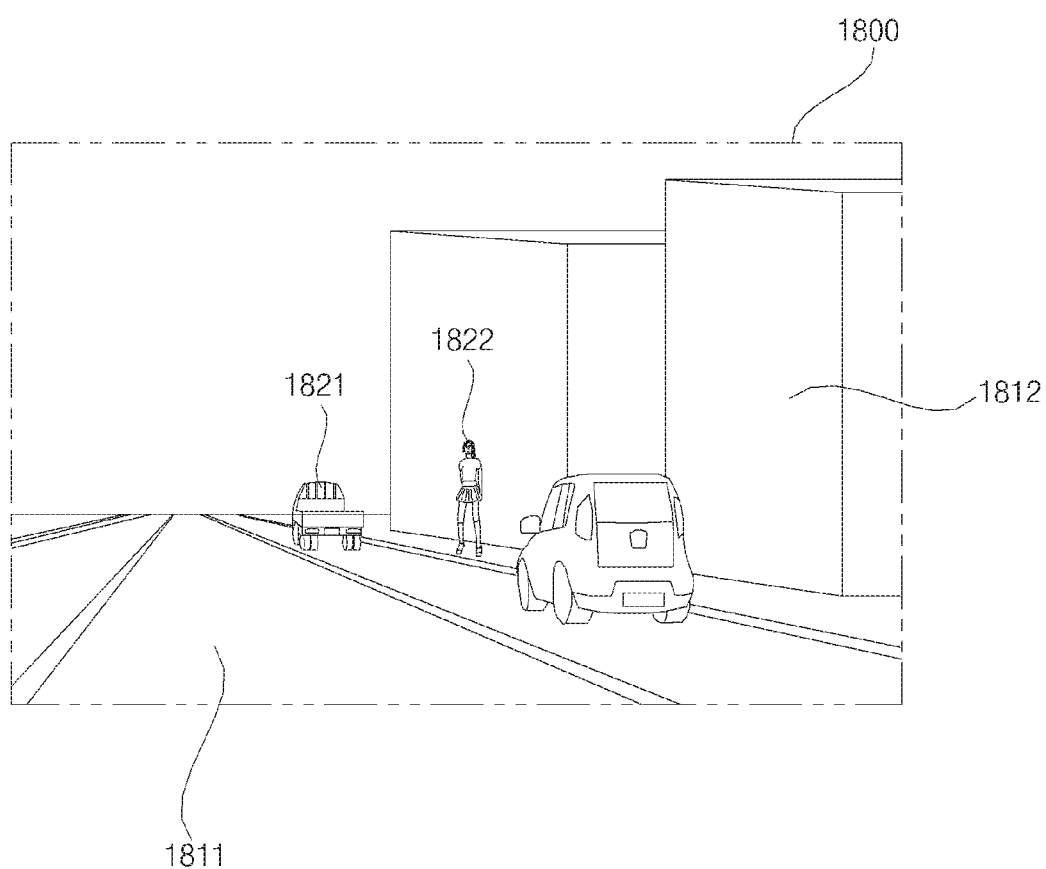

[FIG. 19]
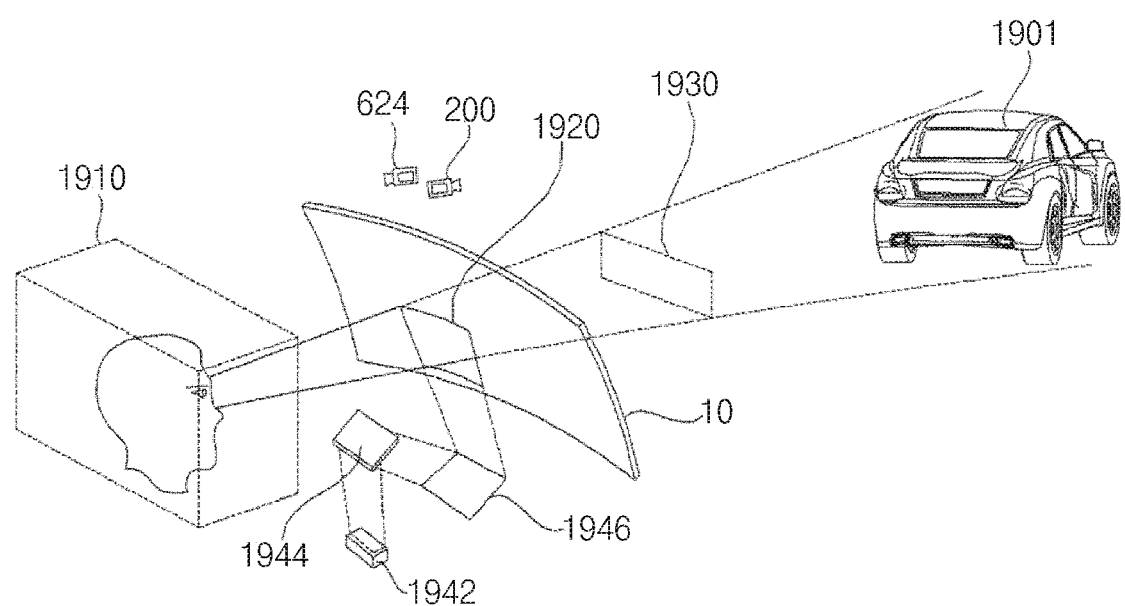

VEHICLE DISPLAY DEVICE AND VEHICLE

CROSS-REFERENCE TO RELATED APPLICATIONS

This application is a National Stage application under 35 U.S.C. § 371 of International Application No. PCT/KR2016/005681, filed on May 30, 2016. The disclosure of the prior application is incorporated by reference in its entirety.

TECHNICAL FIELD

The present invention relates to a display apparatus provided in a vehicle and a vehicle.

BACKGROUND ART

A vehicle is an apparatus that is moved in a direction desired by a boarding user. Typically, an automobile is an example of the vehicle.

Meanwhile, for the convenience of a user who uses the vehicle, various sensors and electronic devices are provided. In particular, for the convenience of the user, research on Advanced Driver Assistance System (ADAS) is being actively carried out. Furthermore, development of an autonomous vehicle is being actively carried out.

Among the objects positioned around the vehicle, there exist objects that are hidden in the driver's view. Preceding vehicles, pedestrians, and the like may be hidden due to the shape of roads, structures positioned around road, terrain, and other vehicles. If these objects appear instantaneously when a driver travels at high speed while the objects are hidden by other objects or terrain, the probability of occurrence of accident is very high.

Therefore, there is a need for development of apparatuses for notifying the driver of such objects.

DISCLOSURE

Technical Problem

The present invention has been made in view of the above problems, and it is an object of the present invention to provide a display apparatus for vehicle which displays graphic object corresponding to hidden object.

It is also an object of the present invention to provide a vehicle including the above apparatus.

The problems of the present invention are not limited to the above-mentioned problems, and other problems not mentioned can be clearly understood by those skilled in the art from the following description.

Technical Solution

In an aspect, there is provided a display apparatus for vehicle including: a display unit; an interface unit; and a processor configured to receive information on a first object and a second object positioned outside a vehicle through the interface unit, and control the display unit to display a graphic object corresponding to the first object, when the second object is positioned between the vehicle and the first object.

The details of other embodiments are included in the detailed description and the drawings.

Advantageous Effects

According to the embodiment of the present invention, there is one or more of the following effects.

First, there is an effect that a driver recognizes an object by displaying a graphic object corresponding to an invisible object of the driver on a display unit.

Second, by displaying a graphic object as an augmented reality, there is an effect that a driver can intuitively recognize an object.

Third, there is an effect of preventing an accident by displaying a graphic object corresponding to an object appropriately according to a traveling situation.

Fourth, there is an effect of preventing an accident by controlling a driving unit of vehicle appropriately according to a traveling situation.

The effects of the present invention are not limited to the effects mentioned above, and other effects not mentioned can be clearly understood by those skilled in the art from the description of the claims.

DESCRIPTION OF DRAWINGS

FIG. 1A is a diagram illustrating the appearance of a vehicle according to an embodiment of the present invention.

FIG. 1B is a diagram illustrating an interior of a vehicle according to an embodiment of the present invention.

FIG. 2 is a block diagram for explaining a vehicle according to an embodiment of the present invention.

FIG. 3A is a perspective view of a vehicle camera according to an embodiment of the present invention. FIG. 3B is an exploded perspective view of a vehicle camera according to an embodiment of the present invention. FIG. 3C is a cutaway side view of the vehicle camera, taken along line A-B of FIG. 3A, according to an embodiment of the present invention. FIG. 3D is a perspective view illustrating an example vehicle camera. FIG. 3E is an exploded perspective view illustrating an example vehicle camera. FIG. 3F is a cutaway side view of the vehicle camera, taken along line C-D in FIG. 3D.

FIG. 4A and FIG. 4B illustrate various examples of internal block diagrams of processors of FIGS. 3A to 3F, and FIGS. 5A to 5D are diagrams for explaining the operation of the processors of FIG. 4A and FIG. 4B.

FIG. 6 is a block diagram for explaining a display apparatus for vehicle according to an embodiment of the present invention.

FIG. 7 is a diagram for explaining the internal configuration of a processor, according to an embodiment of the present invention.

FIG. 8 and FIG. 9 are diagrams for explaining a situation in which a preceding vehicle is hidden by a road slope before a vehicle enters an inclination, according to an embodiment of the present invention.

FIG. 10A to FIG. 10D are diagrams for explaining a displayed graphic object in the situation of FIG. 8 and FIG. 9, according to an embodiment of the present invention.

FIG. 11 is a diagram for explaining a situation in which other vehicle is hidden by a building before entering an intersection according to an embodiment of the present invention.

FIG. 12 is a diagram for explaining a displayed graphic object in the situation of FIG. 11, according to an embodiment of the present invention.

FIG. 13 is a diagram for explaining a situation in which a pedestrian is hidden by other vehicle during traveling of vehicle, according to an embodiment of the present invention.

FIG. 14 is a diagram for explaining a displayed graphic object in the situation of FIG. 13, according to an embodiment of the present invention.

FIG. 15 is a diagram for explaining a situation in which a preceding vehicle is hidden by a road surrounding terrain, before a vehicle enters a corner, according to an embodiment of the present invention.

FIG. 16 is a diagram for explaining a displayed graphic object in the situation of FIG. 15, according to an embodiment of the present invention.

FIG. 17 is a diagram for explaining various graphic objects according to an embodiment of the present invention.

FIG. 18 is a diagram for explaining a 3D drawing according to an embodiment of the present invention.

FIG. 19 is a conceptual diagram for explaining an operation of a display apparatus 600 for vehicle to implement an augmented reality image through a windshield 10 according to an embodiment of the present invention.

MODE FOR INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated. In general, suffixes such as "module" and "unit" may be used to refer to elements or components. Use of such suffixes herein is merely intended to facilitate description of the specification, and the suffixes do not have any special meaning or function. In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

Terms such as "includes" or "has" used herein should be considered as indicating the presence of several components, functions or steps, disclosed in the specification, and it is also understood that more or fewer components, functions, or steps may likewise be utilized.

A vehicle described in the present specification may include an automobile, a motorcycle. Hereinafter, the automobile is described mainly with respect to the vehicle.

The vehicle described in the present specification may include all of an internal combustion engine vehicle having an engine as a power source, a hybrid vehicle having an engine and an electric motor as a power source, an electric vehicle having an electric motor as a power source, and the like.

In the following description, the left side of vehicle means the left side in the traveling direction of vehicle, and the right side of vehicle means the right side in the traveling direction of vehicle.

FIG. 1A is a diagram illustrating the appearance of a vehicle according to an embodiment of the present invention. FIG. 1B is a diagram illustrating an interior of a vehicle according to an embodiment of the present invention.

Referring to the drawing, a vehicle 100 may include a wheel rotated by a power source, and a steering input apparatus for adjusting the traveling direction of the vehicle 100.

According to an embodiment, the vehicle 100 may be an autonomous vehicle. In the case of an autonomous vehicle, it can be switched to an autonomous drive mode or a manual mode according to user input. When it is switched to the manual mode, the autonomous vehicle 100 may receive a steering input through the steering input apparatus.

The vehicle 100 may include a vehicle driving assistance apparatus 400. The vehicle driving assistance apparatus 400 is an apparatus that assists a driver based on information acquired from various sensors. Such a vehicle driving assistance apparatus 400 may be named Advanced Driver Assistance System (ADAS).

Meanwhile, the vehicle 100 may include an internal sensing unit 125 and an external sensing unit 126. In particular, the external sensing unit 126 may detect an object positioned outside the vehicle 100. According to an embodiment, the external sensing unit 126 may be classified as a sub-element of the vehicle driving assistance apparatus 400.

In the present specification, a vehicle camera 200 is mainly described as a sensor used in the vehicle driving assistance apparatus 400, but is not limited thereto. According to an embodiment, the sensor may be a radar 201, a lidar 202, an ultrasonic sensor 203, and the like, in addition to the vehicle camera 200.

In the drawing, it is illustrated that the vehicle camera 200 used in the vehicle driving assistance apparatus 400 is mounted in a front windshield 10 so that the camera 200 can photograph the front of the vehicle.

The vehicle camera 200 can photograph anywhere including the front, rear, right, left sides of the vehicle. Accordingly, the vehicle camera 200 may be disposed in an appropriate position in the outside or inside the vehicle.

The vehicle 100 may include a display apparatus 600 for vehicle. The display apparatus 600 for vehicle may output various types of information, various contents, and the like. The display apparatus 600 for vehicle may display a graphic object on the display unit 651.

The display unit 651 included in the display apparatus 600 for vehicle may be implemented on a front windshield 10, a side window, or a rear glass.

For example, the display apparatus 600 for vehicle may be implemented as a head up display (HUD), and may output information or contents by projecting an image on the front windshield 10, the side window, or the rear glass. In this case, the front windshield 10, the side window, or the rear glass may serve as a screen. In order to serve as a screen, a certain film may be attached on the front windshield 10, the side window, or the rear glass.

For example, the display apparatus 600 for vehicle may include a transparent display. The transparent display may be disposed close to the front windshield 10, the side window, or the rear glass. The display apparatus 600 for vehicle may output information or contents through the transparent display.

The overall length means a length from the front portion of the vehicle 100 to the rear portion, the width means a breadth of the vehicle 100, and the height means a length from the bottom of the wheel to the roof. In the following description, it is assumed that the overall length direction L is a direction used as a reference for the measurement of the overall length of the vehicle 100, the width direction W is a direction used as a reference for the measurement of the width of the vehicle 100, and the height direction H is a direction used as a reference for the measurement of the height of the vehicle 100.

FIG. 2 is a block diagram for explaining a vehicle according to an embodiment of the present invention.

Referring to FIG. 2, the vehicle 100 may include an input unit 120, an internal sensing unit 125, an external sensing unit 126, a memory 130, an output unit 140, a vehicle driving unit 150, a controller 170, an interface unit 180, a power supply unit 190, a vehicle driving assistance apparatus 400, a display apparatus 600 for vehicle, and a navigation apparatus 300.

The input unit 120 may include a driving operation apparatus 121, a microphone 123, and a user input unit 124.

The driving operation apparatus 121 receives a user input for driving the vehicle 100. The driving operation apparatus 121 may include a steering input apparatus, a shift input apparatus, an acceleration input apparatus, and a brake input apparatus.

The steering input apparatus receives a forward direction input of the vehicle 100 from a user. It is preferable that the steering input apparatus is formed in a wheel shape so that steering input can be accomplished by rotation. According to an embodiment, the steering input apparatus may be formed of a touch screen, a touch pad, or a button.

The shift input apparatus receives inputs of parking (P), forward (D), neutral (N), and reverse (R) of the vehicle 100 from the user. The shift input apparatus is preferably formed in a lever shape. According to an embodiment, the shift input apparatus may be formed of a touch screen, a touch pad, or a button.

The acceleration input apparatus receives an input for acceleration of the vehicle 100 from the user. The brake input apparatus receives an input for deceleration of the vehicle 100 from the user. The acceleration input apparatus and the brake input apparatus are preferably formed in the form of a pedal. According to an embodiment, the acceleration input apparatus or the brake input apparatus may be formed of a touch screen, a touch pad, or a button.

The microphone 123 may process an external sound signal into electrical data. The processed data may be utilized variously according to the function being performed in the vehicle 100. The microphone 123 may convert the user's voice command into electrical data. The converted electrical data may be transmitted to the controller 170.

Meanwhile, According to an embodiment, the camera 122 or the microphone 123 may be a component included in the sensing unit 125, not a component included in the input unit 120.

The user input unit 124 is used for receiving information from a user. When the information is input through the user input unit 124, the controller 170 may control the operation of the vehicle 100 to correspond to the input information. The user input unit 124 may include a touch input means or a mechanical input means. According to an embodiment, the user input 124 may be disposed in one area of a steering wheel. In this case, the driver may operate the user input unit 124 by using his or her finger while holding the steering wheel.

The internal sensing unit 125 senses various situations of the vehicle 100. To this end, the sensing unit 125 may include a collision sensor, a wheel sensor, a speed sensor, a tilt sensor, a weight sensor, a heading sensor, a yaw sensor, a gyro sensor, a position sensor, a vehicle forward/reverse sensor, a battery sensor, a fuel sensor, a tire sensor, a steering sensor for a steering wheel rotation, a vehicle interior temperature sensor, a vehicle interior humidity sensor, an ultrasonic sensor, an brightness sensor, an accelerator pedal position sensor, a brake pedal position sensor, and the like.

The sensing unit 125 may acquire a sensing signal relating to vehicle collision information, vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, a steering wheel rotation angle, a vehicle exterior brightness, a pressure applied to an accelerator pedal, a pressure applied to a brake pedal, and the like.

In addition, the sensing unit 125 may further include an accelerator pedal sensor, a pressure sensor, an engine speed sensor, an air flow sensor (AFS), an air flow sensor (AFS), an air temperature sensor (ATS), a water temperature sensor WTS, a throttle position sensor (TPS), a TDC sensor, a crank angle sensor (CAS), and the like.

The external sensing unit 126 may sense the external situation of the vehicle. The external sensing unit 126 may sense an object positioned outside the vehicle.

The external sensing unit 126 may include a camera 200, a radar 201, a lidar 202, an ultrasonic sensor 203, and an infrared sensor 204.

The camera 200 may be named as a camera apparatus for vehicle. The camera 200 may include a mono camera 200a of FIGS. 3A to 3C and a stereo camera 200b of FIGS. 3D to 3F.

The radar 201 may include an electromagnetic wave transmitter, a receiver, and a processor. The radar 201 may be implemented by a pulse radar method or a continuous wave radar method in terms of the radio wave emission principle. In addition, among the continuous wave radar method, the radar 201 may be implemented by a frequency modulated continuous wave (FMCW) method or a frequency shift keying (FSK) method according to a signal waveform.

The radar 201 may detect an object based on the transmitted electromagnetic waves, and may detect the distance to the detected object and the relative speed.

The radar 201 may provide acquired object information to the controller 170, the vehicle driving assistance apparatus 400, or the display apparatus 600 for vehicle. Here, the object information may include distance information with respect to the object.

The lidar 202 may include a laser transmitter, a receiver, and a processor. The lidar 202 may be implemented in a time-of-flight (TOF) type or a phase-shift type.

The TOF type lidar 202 emits a laser pulse signal and receives a reflect pulse signal reflected by the object. The lidar 202 may measure the distance to the object based on the time at which the laser pulse signal is emitted and the reflect pulse signal is received. Further, a relative speed for the object may be measured based on the change of the distance according to time.

Meanwhile, the phase shift type lidar 202 may emit a laser beam continuously modulated with a specific frequency, and may measure the time and the distance to the object based on a phase change amount of the signal reflected by the object. Further, the relative speed for the object may be measured based on the change of the distance according to time.

The lidar 202 may detect the object based on the transmitted laser, and may detect the distance to the detected object and the relative speed.

The lidar 202 may provide the acquired object information to the controller 170, the vehicle driving assistance apparatus 400, or the display apparatus 600 for vehicle. Here, the object information may include distance information with respect to the object.

The ultrasonic sensor 203 may include an ultrasonic transmitter, a receiver, and a processor. The ultrasonic sensor 203 may detect an object based on the transmitted ultrasonic wave, and may detect the distance to the detected object and the relative speed.

The ultrasonic sensor 203 may provide the acquired object information to the controller 170, the vehicle driving assistance apparatus 400, or the display apparatus 600 for vehicle. Here, the object information may include distance information with respect to the object.

The memory 130 is electrically connected to the controller 170. The memory 130 may store basic data for a unit, control data for controlling the operation of the unit, and input/output data. The memory 130 may be, in hardware, various storage apparatuses such as ROM, RAM, EPROM, flash drive, hard drive, and the like. The memory 130 may store various data for the overall operation of the vehicle 100, such as a program for processing or controlling the controller 170.

The output unit 140 is used for outputting information processed by the controller 170, and may include a sound output unit 142 and a haptic output unit 143. According to an embodiment, the display apparatus 600 for vehicle may be classified as a sub-element of the output unit 140.

The sound output unit 142 converts the electric signal from the controller 170 into an audio signal and outputs the audio signal. For this purpose, the sound output unit 142 may include a speaker or the like. It is also possible for the sound output unit 142 to output a sound corresponding to the operation of the user input unit 724.

The haptic output unit 143 generates a tactile output. For example, the haptic output unit 143 may operate to vibrate a steering wheel, a seat belt, and a seat so that user can recognize the output.

The vehicle driving unit 150 may control the operation of various apparatuses of the vehicle. The vehicle driving unit 150 may include a power source driving unit 151, a steering driving unit 152, a brake driving unit 153, a lamp driving unit 154, an air conditioning driving unit 155, a window driving unit 156, an airbag driving unit 157, a sunroof driving unit 158, and a suspension driving unit 159.

The power source driving unit 151 may perform electronic control of a power source in the vehicle 100.

For example, when a fossil fuel-based engine (not shown) is a power source, the power source driving unit 151 may perform electronic control of the engine. Thus, the output torque of the engine, and the like may be controlled. When the power source driving unit 151 is an engine, the engine output torque may be limited under the control of the controller 170 to limit the traveling speed of the vehicle.

As another example, when an electric-based motor (not shown) is a power source, the power source driving unit 151 may perform control of the motor. Thus, the rotation speed, torque, and the like of the motor may be controlled.

The steering driving unit 152 may perform electronic control of the steering apparatus in the vehicle 100. Thus, the traveling direction of the vehicle may be changed.

The brake driving unit 153 may perform electronic control of a brake apparatus (not shown) in the vehicle 100. For example, it may reduce the speed of the vehicle 100 by controlling the operation of the brakes disposed in the wheel. As another example, it may adjust the traveling direction of the vehicle 100 to the left or right by differently operating the brakes respectively disposed in the left wheel and the right wheel.

The lamp driving unit 154 may control the turn-on/turn-off of the lamps disposed inside and outside the vehicle. In addition, the intensity, direction, or the like of the light of the lamp can be controlled. For example, the lamp driving unit 154 may perform control of a direction indicating lamp, a brake lamp, and the like.

The air conditioning driving unit 155 may perform electronic control of an air conditioner (not shown) in the vehicle 100. For example, when the temperature inside the vehicle is high, the air conditioner may be operated to control the cooling air to be supplied into the vehicle.

The window driving unit 156 may perform electronic control of the window apparatus in the vehicle 100. For example, the window driving unit 156 may control the opening or closing of left and right windows in the lateral side of the vehicle.

The airbag driving unit 157 may perform electronic control of the airbag apparatus in the vehicle 100. For example, in case of danger, the airbag may be controlled to inflate.

The sunroof driving unit 158 may perform electronic control of a sunroof apparatus (not shown) in the vehicle 100. For example, the sunroof driving unit 158 may control the opening or closing of the sunroof.

The suspension driving unit 159 may perform electronic control of a suspension apparatus (not shown) in the vehicle 100. For example, when there is unevenness on the road surface, the suspension driving unit 159 may control the suspension apparatus to reduce the vibration of the vehicle 100.

Meanwhile, According to an embodiment, the vehicle driving unit 150 may include a chassis driving unit. Here, the chassis driving unit may include a steering driving unit 152, a brake driving unit 153, and a suspension driving unit 159.

The controller 170 may control the overall operation of each unit in the vehicle 100. The controller 170 may be referred to as an Electronic Control Unit (ECU).

The controller 170 may be implemented in hardware by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic unit for performing other functions.

The interface unit 180 may serve as a channel to various kinds of external devices connected to the vehicle 100. For example, the interface unit 180 may include a port that can be connected to a mobile terminal, and may be connected to the mobile terminal through the port. In this case, the interface unit 180 may exchange data with the mobile terminal.

Meanwhile, the interface unit 180 may serve as a channel for supplying electrical energy to the connected mobile terminal. When the mobile terminal is electrically connected to the interface unit 180, the interface unit 180 may provide the mobile terminal with electric energy supplied from a power supply unit 190 under the control of the controller 170.

The power supply unit 190 may supply power necessary for operation of respective components under the control of the controller 170. Particularly, the power supply unit 190 may receive power from a battery (not shown) or the like inside the vehicle.

The vehicle driving assistance apparatus 400 may assist the driver in driving the vehicle.

The vehicle driving assistance apparatus 400 may provide an autonomous emergency braking (AEB), an adaptive cruise control (ACC), a cross traffic alert (CTA), a lane change assistant (LCA), a forward collision warning (FCW), a lane departure warning (LDW), a lane keeping assist (LKA), speed assist system (SAS), traffic sign recognition (TSR), high beam assist (HBA), blind spot detection (BSD), autonomous emergency steering (AES), curve speed warning system (CSWS), smart parking assist system (SPAS), traffic jam assist (TJA), and around view monitor (AVM).

The display apparatus 600 for vehicle may display various information or various contents.

For example, the display apparatus 600 for vehicle may display vehicle-related information. Here, the vehicle-related information may include vehicle control information for direct control of the vehicle, or vehicle driving assistance information for a driving guide to a vehicle driver. In addition, the vehicle-related information may include vehicle state information indicating the current state of a vehicle or vehicle driving information related to the driving of a vehicle.

Meanwhile, the display apparatus 600 may include a cluster so that a driver can check the vehicle state information or the vehicle driving information while driving.

Meanwhile, According to an embodiment, the display apparatus 600 may be implemented as a head up display (HUD). When the display apparatus 600 is implemented as the HUD, the display apparatus 600 may include a projection module to output information through an image projected on the front windshield 10.

Meanwhile, According to an embodiment, the display apparatus 600 may include a transparent display. In this case, the transparent display may be attached to the front windshield 10.

The transparent display may display a certain screen while having a certain transparency. In order to have transparency, the transparent display may include at least one of thin film electroluminescent (TFEL), transparent organic light-emitting diode (transparent OLED), transparent liquid crystal display (transparent LCD), transmissive transparent display, transparent light emitting diode (transparent LED), or the like. The transparency of the transparent display may be adjusted.

The navigation apparatus 300 may provide navigation information to the display apparatus 600 for vehicle. According to an embodiment, the navigation apparatus 300 may be formed integrally with the display apparatus 600 for vehicle.

The navigation information may include set destination information, route information according to destination setting, map information related to vehicle driving, and current position information of vehicle. Meanwhile, the navigation information may include position information of vehicle on a road.

FIG. 3A is a perspective view of a vehicle camera according to an embodiment of the present invention. FIG. 3B is an exploded perspective view of a vehicle camera according to an embodiment of the present invention. FIG. 3C is a cutaway side view of the vehicle camera, taken along line A-B of FIG. 3A, according to an embodiment of the present invention.

The vehicle camera 200 described below with reference to FIG. 3A to FIG. 3C is a single camera 200a.

The vehicle camera 200a may include a lens 211, an image sensor 214, and a processor 470.

According to an embodiment, the vehicle camera 200a may further include a processing board 220, a light shield 230, a heat dissipation member 240, and a housing 250 individually, or a combination thereof.

Meanwhile, the housing 250 may include a first housing 251, a second housing 252, and a third housing 253.

The lens 211 may be fastened to be received in a hole 219 formed in a part of the first housing 251 through a nut 212, while being accommodated in a lens housing 217.

The image sensor 214 may include at least one photoelectric conversion element capable of converting an optical signal into an electrical signal. For example, the image sensor 214 may be a charge-coupled device (CCD) or a complimentary metal-oxide semiconductor (CMOS).

The image sensor 214 may be positioned in the outside of the vehicle or in a suitable location inside the vehicle to acquire an exterior vehicle image or an interior vehicle image.

For example, the image sensor 214 may be disposed close to the front windshield 10, in the interior of the vehicle, to acquire a forward image of the vehicle. Alternatively, the image sensor 214 may be disposed around a front bumper or a radiator grill.

For example, the image sensor 214 may be disposed close to a rear glass, in the interior of the vehicle, to acquire a rearward image of the vehicle. Alternatively, the image sensor 214 may be disposed around a rear bumper, a trunk, or a tailgate.

For example, the image sensor 214 may be disposed close to at least one of the side windows in the interior of the vehicle to acquire an image of the lateral side of the vehicle. Alternatively, the image sensor 214 may be disposed around a side mirror, a fender, or a door.

The image sensor 214 may be disposed in the rear end of the lens 211 so as to acquire an image based on the light introduced through the lens 211. For example, the image sensor 214 may be disposed vertically based on the ground while being spaced apart from the lens 211 by a certain distance.

The processor 470 may be electrically connected to the image sensor 214. The processor 470 may process the image acquired through the image sensor 214. The processor 470 may control the image sensor 214.

The processor 470 may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electric units for performing other functions.

The processor 470 may be mounted on the processing board 220.

The processing board 220 may install the processor 270 and the memory 440.

The processing board 220 may be disposed to be inclined in the longitudinal direction. For example, the processing board 220 may be disposed so that the front surface or rear surface thereof faces the front windshield 10. For example, the processing board 220 may be disposed in parallel with the front windshield 10.

The front windshield 10 provided in the vehicle 100 is generally formed to be inclined at a certain angle with the ground from the bonnet of the vehicle 100 to the roof. In this case, since the processing board 220 is inclined in the longitudinal direction, the vehicle camera 200a may be formed smaller than the case where the processing board 220 is vertically or horizontally disposed. As the vehicle camera 200a is formed in a small size, there is an advantage that a more space can be secured in the vehicle 100 by a reduced volume.

A plurality of devices or electronic components may be mounted on the processing board 220. At this time, heat may be generated due to a plurality of devices or components included in the processing board 220.

The processing board 220 may be disposed apart from the image sensor 241. As the processing board 220 is disposed apart from the image sensor 241, the heat generated in the processing board 220 does not cause a problem in the performance of the image sensor 241.

The processing board 220 may be disposed in an optimal position so that the heat generated in the processing board 220 does not affect the image sensor 241. Specifically, the processing board 220 may be disposed in the lower end of the image sensor 241. Alternatively, the processing board 220 may be disposed in the front end of the image sensor 241.

One or more memories 440 may be mounted in the processing board 220. The memory 440 may store image acquired through the image sensor 241, various application data, data for controlling the processor 470, or data processed in the processor 470. The memory 440, like the processor 470, is one of the main heat generating elements. In a state in which the processor 470 is disposed in the center of the processing board 220, the memory 440 may be disposed around the processor 470. For example, the one or more memories 440 may be disposed in a shape that surrounds the processor 470, while the processor 470 is disposed in the center. In this case, the processor 470 and the memory 440, which are heat generating elements, may be disposed in the farthest position from the image sensor 241.

The processor 470 may be electrically connected to the controller 170. The processor 470 may be controlled under the control of the controller 170.

The light shield 230 may be disposed in the front end of the lens 211. The light shield 230 may block the light that is unnecessary for image acquisition from flowing into the lens 211. For example, the light shield 230 may block the light reflected from the windshield 10 or the dashboard of the vehicle. Further, the light shield 230 may block the light generated from an unnecessary light source.

The light shield 230 may have the structure of a screen. For example, the light shield 230 may have the structure of a lower screen.

Meanwhile, the shape of the light shield 230 may vary among types of vehicles. For example, the curvature of the windshield and the angle between the windshield and the ground may vary among the types of vehicles. Accordingly, the light shield 230 may have a shape corresponding to the type of the vehicle on which the vehicle camera 200a is mounted. To this end, the light shield 230 may have a detachable structure.

The heat dissipation member 240 may be disposed at the rear end of the image sensor 214. The heat dissipation member 240 may contact an image sensor board on which the image sensor 214 or the image sensor 214 is mounted. The heat dissipation member 240 may dissipate heat of the image sensor 214.

As described above, the image sensor 214 is sensitive to heat. The heat dissipation member 240 may be disposed between the image sensor 214 and the third housing 253. The heat dissipation member 240 may be disposed to contact the image sensor 214 and the third housing 253. In this case, the heat dissipation member 240 may dissipate heat through the third housing 253.

For example, the heat dissipation member 240 may be either a thermal pad or thermal grease.

The housing 250 may include the lens housing 217, the first housing 251, the second housing 252, and the third housing 253.

The lens housing 217 may accommodate at least one lens 211 and protect the lens 211 from external shock.

The first housing 251 may be formed to surround the image sensor 214. The first housing 251 may include a hole 219. The lens 211 may be connected to the image sensor 214 while being seated in the hole 219 when accommodated in the lens housing.

The first housing 251 may be formed to have a thickness which increases as the housing extends toward the image sensor 214. For example, the first housing 251 may be die-cast. In this case, to prevent performance of the processor 470 from being degraded by heat, a proximal part of the first housing 251 close to the image sensor 214 has greater thickness than the other part thereof.

The first housing 251 may have greater thickness than the third housing 253. As thickness of the housing increases, the heat transfer rate is lowered. Accordingly, if the first housing 251 is thicker than the third housing 253, heat generated from the inside of the vehicle camera 200a may be dissipated through the third housing 253 rather than the first housing 251 which is disposed close to the front windshield 10 and thus has difficulty in dissipating heat.

According to an embodiment, the lens housing 217 and the first housing 251 may be integrated with each other.

The second housing 252 may be disposed at the front end of the processing board 220. The second housing 252 may be fastened to the first housing 251 and the third housing 253 by a certain fastening.

The second housing 252 may be provided with an attachment to which the light shield 230 is attachable. The light shield 230 may be attached to the second housing 252 through the attachment.

The first and second housings 252 and 253 may be formed of a synthetic resin.

The third housing 253 may be fastened to the first housing 251 and the third housing 253 by a certain fastening. According to an embodiment, the first, second and third housings 251, 252, 253 may be integrated with each other.

The third housing 253 may be formed to surround the processing board 220. The third housing 253 may be positioned at the rear end or lower end of the processing board 220. The third housing 253 may be formed of a thermally conductive material. For example, the third housing 253 may be formed of metal such as aluminum. As the third housing 253 is formed of a thermally conductive material, heat dissipation may be efficiently implemented.

If the first housing 251 and the second housing 252 are formed of a synthetic resin and the third housing 253 is formed of a thermally conductive material, heat from the inside of the vehicle camera may be dissipated through the third housing 253 rather than the first and second housings 251 and 252. That is, if the vehicle camera 200a is mounted on the windshield, the first and second housings 251 and 252 are positioned close to the windshield, and thus heat cannot be dissipated through the first and second housings 251 and 252. In this case, heat may be efficiently dissipated through the third housing 253.

Forming the third housing 253 with aluminum may be advantageous in protecting the internal components (e.g., the image sensor 214 and the processor 470) from electromagnetic compatibility (EMC) and electrostatic discharge (ESC).

The third housing 253 may contact the processing board 220. In this case, the third housing 253 may transfer heat through a portion thereof contacting the processing board 220. Thereby, heat may be efficiently dissipated.

The third housing 253 may further include a heat dissipation unit 291. For example, the heat dissipation unit 291 may include at least one of a heat sink, a heat dissipation fin, a thermal pad and thermal grease.

The heat dissipation 291 may dissipate heat generated inside of the vehicle camera 200a. For example, the heat dissipation unit 291 may be disposed between the processing board 220 and the third housing 253. The heat dissipation unit 291 may contact the processing board 220 and the third housing 253, thereby dissipating heat generated from the processing board 220.

The third housing 253 may further include an air discharge hole. The air discharge hole serves to discharge hot air from the vehicle camera 200a to the outside of the vehicle camera 200a. An airflow portion connected to the air discharge hole may be included in the vehicle camera 200a. The airflow portion may guide hot air from inside the vehicle camera 200a to the air discharge hole.

The vehicle camera 200a may further include a damp proofing portion. The damp proofing portion may be formed in the shape of a patch and attached to the air discharge portion. The damp proofing portion may be formed of a Gore-Tex material. The damp proofing portion may discharge moisture from the vehicle camera 200a. The damp proofing portion may prevent external moisture from being introduced into the vehicle camera 200a.

FIG. 3D is a perspective view illustrating a vehicle camera according to an embodiment of the present invention. FIG. 3E is an exploded perspective view illustrating the vehicle camera according to an embodiment of the present invention. FIG. 3F is a cutaway side view of the vehicle camera, taken along line C-D of FIG. 3D, according to an embodiment of the present invention.

The vehicle camera 200 described below with reference to FIGS. 3D to 3F is a stereo camera 200b.

All the details of the single camera 200a described above with reference to FIGS. 3A to 3C may be applied to the stereo camera 200b. That is, the first and second cameras included in the stereo camera 200b may be the cameras described above with reference to FIG. 3A to 3C.

The stereo camera 200b may include a first lens 211a, a second lens 211b, a first image sensor 214a, a second image sensor 214b and a processor 470a.

According to an embodiment, the vehicle camera 200b may include a processing board 220a, a first light shield 230a, a second light shield 230b, a housing 250a, or a combination thereof.

The housing may include a first lens housing 217a, a second lens housing 217b, a first housing 251a, a second housing 252a, and a third housing 253a.

The details of the lens 211 described above with reference to FIGS. 3A to 3C may be applied to the first lens 211a and the second lens 211b.

The details of the image sensor 214 of FIGS. 3A to 3C may be applied to the first image sensor 214a and the second image sensor 214b.

Meanwhile, a module including the first lens 211a and the first image sensor 214a may be referred to as a first image acquisition module. In addition, a module including the second lens 211b and the second image sensor 214b may be referred to as a second image acquisition module.

The processor 470a may be electrically connected to the first image sensor 214a and the second image sensor 214b. The processor 470a may perform computer processing on images acquired through the first image sensor 214a and the second image sensor 214b. In this case, the processor 470a may establish a disparity map or perform an operation for disparity based on the images acquired through the first image sensor 214a and the second image sensor 214b.

The processor 470 may be implemented using at least one of application specific integrated circuits (ASICs, digital signal processors (DSPs, digital signal processing devices (DSPDs, programmable logic devices (PLDs, field programmable gate arrays (FPGAs, processors, controllers, microcontrollers, microprocessors, and electric units for performing other functions.

The processor 470a may be mounted on the processing board 220a.

The details of the processing board 220 of FIGS. 3A to 3C may be applied to the processing board 220a.

The details of the light shield 230 of FIGS. 3 to 5 may be applied to the first light shield 230a and the second light shield 230b.

The details of the lens housing 217 of FIGS. 3 to 5 may be applied to the first lens housing 217a and the second lens housing 217b.

The details of the first housing 251 of FIGS. 3A to 3C may be applied to the first housing 251a.

The details of the second housing 252 of FIGS. 3A to 3C may be applied to the second housing 252a.

The details of the third housing 253 of FIGS. 3A to 3C may be applied to the third housing 253a.

FIG. 4A and FIG. 4B illustrate various examples of internal block diagrams of processors of FIGS. 3A to 3F, and FIGS. 5A to 5D are diagrams for explaining the operation of the processors of FIG. 4A and FIG. 4B.

Referring to FIG. 4A, the processor 470 may include an image preprocessor 501, a disparity calculator 502, an object detector 504, an object tracking unit 506, and an application unit 507.

The image preprocessor 501 may receive images from the camera 200 and perform preprocessing thereof.

Specifically, the image preprocessor 501 may perform noise reduction, rectification, calibration, color enhancement, color space conversion (CSC), interpolation and camera gain control for the images. Thereby, an image clearer than the stereo image captured by the camera 200 may be acquired.

The disparity calculator 502 may receive images signal-processed by the image preprocessor 501, perform stereo matching upon the received images, and acquire a disparity map according to the stereo matching. That is, the disparity calculator 502 may acquire disparity information on a stereo image of the front view of the vehicle.

Herein, the stereo matching may be performed in a pixel unit or a certain block unit of the stereo images. The disparity map may represent a map indicating numerical values representing binocular parallax information about the stereo images, namely, left and right images.

The segmentation unit 503 may perform segmentation and clustering on at least one of the images based on the disparity information from the disparity calculator 502.

Specifically, the segmentation unit 503 may separate the background from the foreground in at least one of stereo images based on the disparity information.

For example, a region of the disparity map which has disparity information less than or equal to a certain value may be calculated as the background and removed. Thereby, the foreground may be separated from the background.

As another example, a region having disparity information greater than or equal to a certain value in the disparity map may be calculated as the foreground and the corresponding part may be extracted. Thereby, the foreground may be separated from the background.

By separating, the foreground from the background based on the disparity information extracted based on the stereo images, signal-processing speed, signal-processing amount may be reduced in the subsequent object detection operation.

Next, the object detector 504 may detect an object based on an image segment from the segmentation unit 503.

That is, the object detector 504 may detect an object in at least one of the images based on the disparity information.

Specifically, the object detector 504 may detect an object in at least one of the images. For example, the object detector 504 may detect an object in the foreground separated through image segmentation.

Next, the object verification unit 505 may classify and verify the separated object.

To this end, the object verification unit 505 may use an identification technique employing a neural network, a support vector machine (SVM) technique, an identification technique based on AdaBoost using Haar-like features or the histograms of oriented gradients (HOG) technique.

Meanwhile, the object verification unit 505 may verify an object by comparing the detected object with objects stored in the memory 440.

For example, the object verification unit 505 may verify a nearby vehicle, a lane, a road surface, a signboard, a dangerous area, a tunnel, and the like which are positioned around the vehicle.

The object-tracking unit 506 may track the verified object. For example, the object-tracking unit 506 may sequentially perform verification of an object in the acquired stereo images, computation of the motion or motion vectors of the verified object, and tracking of movement of the object based on the computed motion or motion vector. Thereby, the object tracking unit 506 may track a nearby vehicle, a lane, a road surface, a signboard, a dangerous area, a tunnel, and the like which are positioned around the vehicle.

Next, the application unit 507 may calculate dangerousness to the vehicle 100 based on various objects positioned near the vehicle, for example, another vehicle, a lane, a road surface, a signboard, and the like. In addition, the application unit 507 may calculate possibility of collision with a preceding vehicle and slippage of the vehicle.

In addition, the application unit 507 may output a message for delivering information such as the calculated dangerousness, collision possibility or slippage as driving assistance information. Alternatively, the application unit 507 may generate a control signal for controlling the position or movement of the vehicle 100 as a vehicle control information.

According to an embodiment, the processor 470 may include only some of the imaging preprocessor 501, the disparity calculator 502, the segmentation unit 503, the object detector 504, the object verification unit 505, the object tracking unit 506 and the application unit 507. For example, if the camera 200 is a mono camera, the disparity calculator 502 may not be provided. According to an embodiment, the segmentation unit 503 may not be provided.

FIG. 4B is another exemplary internal block diagram of the processor.

Referring to FIG. 4B, the processor 470 of FIG. 4B has the same internal constituent units as those of the processor 470 of FIG. 4A, but has a different signal processing sequence. Hereinafter, the different signal processing sequence will be described.

The object detector 504 may receive stereo images and detect an object in at least one of the stereo images. In contrast with the example of FIG. 4A, the object may be directly detected in the stereo images rather than being detected in a segmented image based on the disparity information.

Next, the object verification unit 505 classifies and verifies an object detected and separated based on an image segment from the segmentation unit 503 and objects detected by the object detector 504.

To this end, the object verification unit 505 may use an identification technique employing a neural network, the support vector machine (SVM) technique, an identification technique based on AdaBoost using Haar-like features, or the histograms of oriented gradients (HOG) technique.

FIGS. 5A and 5B illustrate operation of the processor 470 of FIGS. 4A to 4C based on stereo images acquired in first and second frame intervals, respectively.

Referring to FIG. 5A, the stereo camera 200b acquires a stereo image during the first frame interval.

The disparity calculator 502 in the processor 470 receives stereo images FR1a and FR1b signal-processed by the image preprocessor 501, and performs stereo matching for the received stereo images FR1a and FR1b, thereby acquiring a disparity map 520.

The disparity map 520 provides levels of parallax between the stereo images FR1a and FR1b. The disparity level may be inversely proportional to the distance to the vehicle.

When the disparity map is displayed, high brightness may be provided to a high disparity level and a low brightness may be provided to a low disparity level.

In FIG. 5A, first to fourth lines 528a, 528b, 528c and 528d have corresponding disparity levels and a construction area 522, a first preceding vehicle 524, and a second preceding vehicle 526 have corresponding disparity levels in the disparity map 520.

The segmentation unit 503, the object detector 504, and the object verification unit 505 perform segmentation, object detection, and object verification for at least one of the stereo images FR1a and FR1b based on the disparity map 520.

In the drawing, object detection and verification are performed for the second stereo image FR1b using the disparity map 520.

That is, object detection and verification may be performed for the first to fourth lines 538a, 538b, 538c, and 538d, the construction area 532, the first preceding vehicle 534, and the second preceding vehicle 536.

Next, referring to FIG. 5B, the stereo camera 200b acquires a stereo image during the second frame interval.

The disparity calculator 502 in the processor 470 receives stereo images FR2a and FR2b signal-processed by the image preprocessor 501, and performs stereo matching on the received stereo images FR2a and FR2b, thereby acquiring a disparity map 540.

In the drawing, first to fourth lines 548a, 548b, 548c and 548d have corresponding disparity levels, and a construction area 542, a first preceding vehicle 544 and a second preceding vehicle 546 have corresponding disparity levels in the disparity map 540.

The segmentation unit 503, the object detector 504, and the object verification unit 505 perform segmentation, object detection, and object verification for at least one of the stereo images FR2a and FR2b based on the disparity map 540.

In the drawing, it is illustrated that object detection and verification are performed on the second stereo image FR2 b using the disparity map 540.

That is, object detection and verification may be performed for the first to fourth lines 548 a, 548 b, 548c and 548d, construction area 552, first preceding vehicle 554, and second preceding vehicle 556 in the image 550.

The object-tracking unit 506 may track a verified object by comparing FIG. 5A with FIG. 5B.

Specifically, the object-tracking unit 506 may track movement of an object based on motions or motion vectors of respective objects verified in FIGS. 5A and 5B. Thereby, lanes, a construction area, a first preceding vehicle, a second preceding vehicle and the like positioned around the vehicle may be tracked.

FIGS. 5C and 5D illustrate operation of a vehicle camera.

FIG. 5C illustrates an exemplary front situation of the vehicle whose images are captured by the stereo camera 200b provided in the vehicle. In particular, the vehicle front situation is displayed as a bird's eye view image.

Referring to FIG. 5C, a first lane line 642a, a second lane line 644a, a third lane line 646a, and a fourth lane line 648a are positioned from left to right. A construction area 610a is positioned between the first lane line 642a and the second lane line 644a, a first preceding vehicle 620a is positioned between the second lane line 644a and the third lane line 646a, and a second preceding vehicle 630a is positioned between the third lane line 646a and the fourth lane line 648a.

FIG. 5D illustrates displaying a vehicle front situation recognized by the vehicle driving assistance apparatus along with various kinds of information. In particular, the image shown in FIG. 5D may be displayed on the display apparatus 600 for vehicle.

FIG. 5D illustrates displaying information based on images captured by the stereo camera 200, in contrast with the example of FIG. 5C.

Referring to FIG. 5D, a first lane line 642b, a second lane line 644b, a third lane line 646b, and a fourth lane line 648b are presented from the left to the right. A construction area 610b is positioned between the first lane line 642b and the second lane line 644b, a first preceding vehicle 620b is positioned between the second lane line 644b and the third lane line 646b, and a second preceding vehicle 630b is positioned within the third lane line 646b and the fourth lane line 648b.

The camera 200 for vehicle may perform signal processing based on the stereo images captured by the stereo camera 200b, thereby verifying objects corresponding to the construction area 610b, the first preceding vehicle 620b and the second preceding vehicle 630b. In addition, the vehicle driving assistance apparatus 100 may verify the first lane line 642b, the second lane line 644b, the third lane line 646b, and the fourth lane line 648b.

In the drawing, to indicate that the objects corresponding to the construction area 610b, the first preceding vehicle 620b, and the second preceding vehicle 630b are verified, the objects are highlighted using edge lines.

The camera 200 for vehicle may calculate distance information on the construction area 610b, the first preceding vehicle 620b, and the second preceding vehicle 630b, based on the stereo images captured by the stereo camera 200b.

In the drawing, first calculated distance information 611b, second calculated distance information 620b, and third calculated distance information 630b corresponding to the construction area 610b, the first preceding vehicle 620b, and the second preceding vehicle 630b respectively are displayed.

The camera 200 for vehicle may receive sensor information about the vehicle from the controller 170 or the internal sensing unit 125. In particular, the camera 200 may receive and display the vehicle speed information, gear information, yaw rate information indicating a variation rate of the yaw of the vehicle, and angle information about the vehicle.

In the drawing, vehicle speed information 672, gear information 671, and yaw rate information 673 are displayed on the upper portion 670 of the vehicle front view image, and vehicle angle information 682 is displayed on the lower portion 680 of the vehicle front view image. However, various examples other than the illustrated example are possible. Additionally, vehicle width information 683 and road curvature information 681 may be displayed along with the vehicle angle information 682.

FIG. 6 is a block diagram for explaining a display apparatus for vehicle according to an embodiment of the present invention.

Referring to FIG. 6, the display apparatus 600 for vehicle may include a communication unit 610, an input unit 620, an interface unit 630, a memory 640, an output unit 650, a processor 670, and a power supply unit 690.

The communication unit 610 may include one or more modules for enabling wireless communication between the display apparatus 600 for vehicle and a mobile terminal, between the display apparatus 600 for vehicle and an external server, or between the display apparatus 600 for vehicle and other vehicle. In addition, the communication unit 610 may include one or more modules that connect the display apparatus 600 for vehicle to one or more networks.

The communication unit 610 may include a broadcast receiver 611, a wireless internet unit 612, a short range communication unit 613, a position information unit 614, and a V2X communication unit 615.

The broadcast receiver 611 receives a broadcast signal or broadcast-related information from an external broadcast management server through a broadcast channel. Here, the broadcast includes a radio broadcast or a TV broadcast.

The wireless internet unit 612 is a module for wireless Internet access. The wireless internet unit 612 is configured to transmit and receive a wireless signal in a communication network according to wireless internet technologies.

Wireless internet technology includes, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless internet unit 612 transmits and receives data according to at least one wireless Internet technology in a range including internet technologies not listed above. For example, the wireless internet unit 612 may wirelessly exchange data with an external server. The wireless internet unit 612 may receive weather information and road traffic situation information (e.g., Transport Protocol Expert Group (TPEG)) from the external server.

The short range communication unit 613 is used for short range communication, and may support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The short range communication unit 613 may form wireless area networks to perform short range communication between the display apparatus 600 for vehicle and at least one external device. For example, the short range communication unit 613 may exchange data with the mobile terminal wirelessly. The short range communication unit 613 may receive weather information and road traffic situation information (e.g., Transport Protocol Expert Group (TPEG)) from the mobile terminal. For example, when user is boarding the vehicle 100, the user's mobile terminal and the display apparatus 600 for vehicle may perform pairing with each other automatically or by application execution by the user.

The position information unit 614 is a module for acquiring position information of the vehicle 100, and a representative example thereof is a Global Positioning System (GPS) module. For example, when the vehicle utilizes the GPS module, the position information unit 614 may acquire the position information of the vehicle using a signal sent from a GPS satellite.

The V2X communication unit 615 is a module for performing wireless communication with an external server or other vehicle. The V2X module 615 includes a module capable of implementing inter-vehicle communication (V2V) or vehicle-to-infrastructure communication (V2I) protocols. The display apparatus 600 for vehicle can perform wireless communication with an external server and other vehicles through the V2X communication module 615.

The V2X communication module 615 can receive position information of a first object from the first object. Here, the first object may be other vehicle or a mobile terminal. For example, the external sensing unit 126 of the vehicle 100 may continuously detect and track the first object. When the first object is hidden by a second object in the state where the first object is being tracked, the V2X communication module 615 may acquire the position information of the first object. In this case, tracking for the first object may be continuously performed.

The input unit 620 may include a user input unit 621, a sound input unit 622, a gesture detection unit 623, and an internal camera 624.

The user input unit 621 is used for receiving information from a user. When the information is inputted through the user input unit 621, the processor 670 may control the operation of the display apparatus 600 for vehicle so as to correspond to the inputted information. The user input unit may include a touch input means or a mechanical input means.

The sound input unit 622 may process an external sound signal into electrical data. The processed data may be utilized variously according to the function being performed in the display apparatus 600 for vehicle. The sound input unit 622 may convert user's voice command into electrical data. The converted electrical data may be transmitted to the processor 670.

The gesture detection unit 623 may detect user's gesture. The gesture detection unit 623 may detect the user's gesture. The gesture detection unit 623 may detect a two-dimensional gesture.

For example, the gesture detection unit may include a light output unit and a light receiving unit. The optical output unit may output infrared light. The light receiving unit may receive a reflected light formed by reflecting the infrared light emitted from the light output unit in the user's hand.

The processor 670 may generate an input signal based on the information provided by the gesture detection unit 623.

The processor 670 may detect the user's gesture based on the reflected light.

The internal camera 624 may acquire an in-vehicle image. The internal camera 624 may detect a user in the photographed in-vehicle image.

For example, the internal camera 624 may detect a driver, a driver's hand, or a driver's finger. Alternatively, the camera 624 may detect a passenger sitting on an assistant seat, a passenger's hand, or a passenger's finger.

The processor 670 may generate an input signal based on the information provided by the internal camera 624.

The processor 670 may generate an input signal based on the information provided by the gesture detection unit 623 and the information provided by the internal camera 624.

The interface unit 630 may receive data, information, and a signal, or may transmit data, information, and a signal processed or generated by the processor 670 to the outside. To this end, the interface unit 630 may perform data communication with the controller 170, the internal sensing unit 125, the external sensing unit 126, the vehicle driving unit 150, and the like in the vehicle by wire communication or wireless communication.

Meanwhile, the interface unit 630 may receive in-vehicle sensing information from the controller 170 or the internal sensing unit 125.

Here, the sensing information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle exterior temperature information, vehicle interior humidity information, vehicle exterior brightness information.

Such sensing information may be acquired by a heading sensor, a yaw sensor, a gyro sensor, a position module, a vehicle forward/reverse sensor, a wheel sensor, a vehicle speed sensor, a vehicle tilting sensor, a battery sensor, a fuel sensor, a tire sensor, a steering sensor for steering wheel rotation, a vehicle interior temperature sensor, a vehicle exterior temperature sensor, a vehicle interior humidity sensor, a brightness sensor, and the like. Meanwhile, the position module may include a GPS module for receiving GPS information.

The interface unit 630 may receive object information from the external sensing unit 126.

For example, the camera 200 of the external sensing unit 126 may perform a lane detection (LD), a vehicle detection (VD), a pedestrian detection (PD), brightspot detection (BD), traffic sign recognition (TSR), and road surface detection, based on the acquired image. The camera 200 may generate distance information with respect to the detected object.

The memory 640 is electrically connected to the processor 670. The memory 640 may store basic data for a unit, control data for controlling the operation of the unit, and input/output data. The memory 640 may be, in hardware, various storage devices such as ROM, RAM, EPROM, flash drive, hard drive, and the like. The memory 640 may store various data for the overall operation of the display apparatus 600 for vehicle, such as a program for processing or controlling the processor 670.

The memory 640 may store map data for implementing navigation function. Here, the map data may be stored as a default at the time of vehicle shipment. Alternatively, the map data may be received from an external device through the communication unit 610 or the interface unit 630.

Meanwhile, according to an embodiment, the memory 640 may be formed integrally with the processor 670.

The memory 640 may store coordinate value information of an eye box corresponding to a driver. When a plurality of drivers operate the vehicle 100, eye box coordinate value information corresponding to each driver may be stored in the memory 640. For example, the eye box coordinate value information may be stored in the memory 640 corresponding to each driver's sitting height.

The eye box may be a space inside the vehicle 100 having a three-dimensional volume. The eye box coordinate value information may be coordinate values that define the boundaries of the eye box.

The output unit 650 may include a display unit 651 and a sound output unit 652.

The display unit 651 may display information processed by the processor 670. For example, the display unit 651 may display the vehicle-related information. Here, the vehicle-related information may include vehicle control information for direct control of the vehicle, or vehicle driving assistance information for a driving guide to a vehicle driver. In addition, the vehicle-related information may include vehicle state information indicating the current state of vehicle or vehicle operation information related to the operation of vehicle.

The display unit 651 may include at least one of a liquid crystal display (LCD), a thin film transistor-liquid crystal display (TFT LCD), an organic light-emitting diode (OLED), a flexible display, a 3D display, and an e-ink display.

The display unit 651 may have a mutual layer structure with the touch sensor or may be integrally formed with the touch sensor to implement a touch screen. Such a touch screen may serve as a user input unit for providing an input interface between the display apparatus 600 for vehicle and a user, and may provide an output interface between the display apparatus 600 for vehicle and the user. In this case, the display unit 651 may include a touch sensor that detects a touch for the display unit 651 so as to receive a control command by a touch method. In this case, the display unit 651 may receive a touch input.

When a touch is accomplished for the display unit 651, the touch sensor detects the touch, and the processor 670 may generate a control command corresponding to the touch based on the touch detection. The content input by the touch method may be a character or a numeral, an instruction in various modes, or a menu item that can be designated.

Meanwhile, the display unit 651 may be configured to display a screen in one area of the windshield.

The display unit 651 may include a transparent display. In this case, the transparent display may be attached to the windshield. In this case, the display apparatus 600 for vehicle may output information through the transparent display.

The transparent display may display a certain screen while having a certain transparency. In order to have transparency, the transparent display may include at least one of a transparent thin film electroluminescent (TFEL), a transparent organic light-emitting diode (OLED), a transparent liquid crystal display (LCD), a transmissive transparent display, and a transparent light emitting diode (LED) display.

Meanwhile, the transparency of the transparent display may be adjusted under the control of the processor 670.

The display apparatus 600 for vehicle may be implemented as a head up display (HUD). In this case, the display unit 651 may include a projection module. In this case, the display apparatus 600 may output information through the image projected on the windshield.

The projection module projects a beam toward a windshield or a screen provided in the vehicle. The projection module may include a light source and a projection lens. The projection module may implement an image corresponding to the information processed in the processor 670. That is, the projection module may implement an image using the light generated by the light source, and project the implemented image to the windshield. At this time, it is preferable to use an LED or a laser as the light source.

The processor 670 is electrically connected to each unit in the display apparatus 600 for vehicle to control the overall operation of each unit.

The processor 670 may control the output unit 650 to output information or data received through the communication unit 610, the input unit 620, or the interface unit 630. The processor 670 may control the output unit 650 so that the information or data stored in the memory 640 can be output. The processor 670 may directly output or process the received information or data. The processor 670 may visually output the information or data through the display unit 651. The processor 670 may acoustically output the information or data through the sound output unit 652.

Meanwhile, the processor 670 may generate new information based on the information or data received through the interface unit 630. The processor 670 may control the display unit 651 to display generated information or a screen corresponding to the generated information.

The processor 670 may receive object information on object positioned outside the vehicle through the interface unit 630. For example, the processor 670 may receive the object information on object positioned outside the vehicle from the external sensing unit 126 or the vehicle driving assistance apparatus 400 through the interface unit 630.

The object may include a lane, other vehicle, a pedestrian, a light, a traffic signal, a road, a structure, a terrain, a speed bump, an animal, and the like.

The lane may be a driving lane, or a side lane of the driving lane. The lane may include left and right lines forming a lane.

Other vehicle may be a vehicle traveling around the vehicle 100. Other vehicle may be a vehicle positioned within a certain distance from the vehicle 100. Other vehicle may be a vehicle preceding or following the vehicle 100. Other vehicle may be a vehicle traveling in a side lane of the driving lane. Other vehicle may be a vehicle that is traveling in a direction intersecting the traveling direction of the vehicle 100 at an intersection.

A pedestrian may be a person positioned on a sidewalk or driveway.

The light may be a light generated from a lamp provided in other vehicle. The light may be a light generated from a street lamp. The light may be a solar light.

A traffic signal may include a traffic light, a traffic sign, and a pattern or text drawn on the road.

The road may include a road surface, a curve, and a slope such as an uphill, and a downhill.

The structure may be an object positioned around the road and fixed to the ground. For example, the structure may include a street lamp, street trees, a building, an electric pole, a traffic light, and the like.

The terrain may include a mountain, a hill, and the like.

Meanwhile, the object may be classified into a moving object and a fixed object. For example, the moving object may include other vehicle, and a pedestrian. For example, the fixed object may include a traffic signal, a road, and a structure.

The processor 670 may receive, through the interface unit 630, information about the first object positioned outside the vehicle.

The first object may be an object that the vehicle driving assistance apparatus 400 or the display apparatus 600 for vehicle is tracking. For example, the first object may be any one of other vehicle, a pedestrian, a speed bump, an animal, and a traffic signal.

The processor 670 may receive, through the interface unit 630, information about a second object positioned outside the vehicle.

The second object may be an object that interferes with the first object tracking. For example, the second object may be any one of other vehicle, road, and structure.

The processor 670 may determine whether the second object is positioned between the vehicle 100 and the first object.

The processor 670 may determine, in the field of view of the camera 200, whether the first object is hidden by the second object. When the first object is hidden by the second object while being tracked, the processor 670 may determine that the first object is positioned between the vehicle 100 and the second object.

When the second object is positioned between the vehicle 100 and the first object, the processor 670 may generate a graphic object corresponding to the first object. The processor 670 may control the display unit 651 so that the graphic object is displayed on the display unit 651.

The processor 670 may control to generate a graphic object corresponding to the first object so that the graphic object can be displayed on the display unit 651. Here, the graphic object may be a text. Alternatively, the graphic object may be a figure or a solid figure. For example, the graphic object may be a plane figure such as a polygon, an ellipse, a circle, and the like. Alternatively, the graphic object may be a solid figure such as a polyhedron, a sphere, a cylinder, a polyprism, and the like. Alternatively, the graphic object may be similar in shape to the first object.

For example, when the first object is other vehicle, the processor 670 may control to generate a vehicle image and display the image on the display unit 651.

For example, when the first object is a pedestrian, the processor 670 may control to generate a human image and display the image on the display unit 651.

Meanwhile, the graphic object may be displayed on the front windshield of the vehicle 100. In this case, the processor 670 may control the graphic object to be displayed as augmented reality.

The driver's sight line is directed to an object positioned outside the vehicle 100 via the front windshield. At this time, by displaying the graphic object on the front windshield, the driver may view the graphic object and the object positioned outside the vehicle 100 together. That is, the processor 670 may allow the driver to view the graphic object and the object positioned outside the vehicle 100 together.

The processor 670 may control to display, on the front windshield, the graphic object on an area corresponding to the second object. For example, the processor 670 may display, on the front windshield, the graphic object to be overlapped with the second object.

The processor 670 may control to display the graphic object, as an augmented reality, in an area of the front windshield that the driver views to check the second object, in a state in which the first object is hidden by the second object.

By controlling in this way, there is an effect that the driver can recognize that the first object is hidden by the second object.

The processor 670 may track the first object. The processor 670 may control to display, on the front windshield, the graphic object on the area corresponding to the position of the tracked first object.

The first object may be a moving object or a fixed object.

When the first object is a moving object, the first object may move relatively in view of the vehicle 100, according to the movement of the vehicle 100 and the first object. In this case, the vehicle driving assistance apparatus 400 or the external sensing unit 126 may track the first object.

When the first object is a fixed object, the first object may move relatively in view of the vehicle 100, according to the movement of the vehicle 100. In this case, the vehicle driving assistance apparatus 400 or the external sensing unit 126 may track the first object.

As the first object moves, the area corresponding to the first object, on the front windshield, may also be continuously changed. The processor 670 may control the area in which the graphic object is displayed to change according to the movement of the first object.

The processor 670 may exchange data with the first object through the V2X communication unit 615. For example, when the first object is other vehicle, the processor 670 may receive position information of other vehicle through the V2X communication unit 615. For example, when the first object is a mobile terminal owned by a pedestrian, the processor 670 may receive the position information of the mobile terminal through the V2X communication unit 615. In this case, the position information of the mobile terminal may be the position information of the pedestrian.

The processor 670 may receive the position information of the first object through the V2X communication unit 615. The processor 670 may track the first object, based on the received position information.

The external sensing unit 126 of the vehicle 100 may detect and continuously track the first object. The processor 670 may receive detection information and tracking information of the first object from the external sensing unit 126 through the interface unit 630. When the first object is hidden by the second object, the processor 670 may receive the position information of the first object through the V2X communication unit 615. The processor 670 may continue to track the first object, based on the position information of the received first object.

The processor 670 may control the change in the size or the change in the color of the graphic object displayed on the display unit 651, based on the distance or the relative speed between the vehicle 100 and the first object.

The processor 670 may acquire distance information with respect to the first object, based on the position information of the first object and the position information of the vehicle 100 acquired through the V2X communication unit 615.

The processor 670 may acquire speed information of the first object, based on position change information of the first object with respect to time. The processor 670 may acquire relative speed information with respect to the first object, based on the speed information of the first object and the speed information of the vehicle 100.

For example, as the distance between the vehicle 100 and the first object becomes shorter, the processor 670 may control the graphic object displayed on the display unit 651 to gradually become larger.

For example, as the relative speed between the vehicle 100 and the first object gradually decreases, the processor 670 may control the graphic object displayed on the display unit 651 to gradually become larger.

For example, as the distance between the vehicle 100 and the first object gradually increases, the processor 670 may control the graphic object displayed on the display unit 651 to gradually become smaller.

For example, as the relative speed between the vehicle 100 and the first object gradually increases, the processor 670 may control the graphic object displayed on the display unit 651 to gradually become smaller.

The processor 670 may control the graphic object to be displayed in a preset color, according to a section corresponding to the distance between the vehicle 100 and the first object, among a plurality of sections. For example, when the distance between the vehicle 100 and the first object is within a first range, the processor 670 may control the graphic object to be displayed in a first color.

The processor 670 may control the graphic object to be displayed in a preset color according to a section corresponding to the relative speed between the vehicle 100 and the first object, among a plurality of sections. For example, when the relative speed between the vehicle 100 and the first object is within the first range, the processor 670 may control the graphic object to be displayed in the first color.

The processor 670 may acquire driver's sight line information through the internal camera 624. The processor 670 may determine, based on the driver's sight line information, whether the first object is hidden by the second object in the driver's sight line. That is, the processor 670 may determine whether the driver can not see the first object because it is hidden by the second object.

When the first object is hidden by the second object in the driver's sight line, the processor 670 may display graphic object as augmented reality, in an area corresponding to the position of the first object, among an area corresponding to the second object, on the front windshield.

The processor 670 may display the graphic object as augmented reality, in an area corresponding to the position of the first object, among an area, in the front windshield, which the driver sees for checking the second object, in a state in which the first object is hidden by the second object.

The processor 670 may control the display unit 651 to display a graphic object corresponding to the hidden portion of the first object, when a part of the first object is hidden by the second object.

For example, the processor 670 may control the graphic object corresponding to the hidden portion of the first object to be displayed as augmented reality while the graphic object extends to the unhidden portion of the first object.

As described above, the graphic object is displayed to extend to the real object of the first object, thereby minimizing the unfamiliarity of the graphic object felt by the user. Further, there is an effect that the user can more clearly recognize the existence of the first object.

The processor 670 may acquire the position information of the eyes of the driver through the internal camera 624. The processor 670 may acquire the position information of the driver's eye of the internal camera 624 through a distance detection algorithm.

When the acquired eye position is escaped from an eye box stored in the memory 640, the processor 670 may control the display unit 651 to change the display area of the graphic object.

When an augmented reality image is implemented through a virtual image, in order for the driver to recognize the augmented reality image, the position of the driver's eye must be positioned in the eye box. When the driver's sight line escapes from the eye box, only a part of the augmented reality image may be visible, or the augmented reality image may not be visible at all. When the position of the driver's eye is out of the eye box, the display area of the graphic object is controlled to be changed, and thus, there is an effect that the driver continuously recognizes the augmented reality image.

The processor 670 may receive, through the interface unit 630, state information of the vehicle. The state information of the vehicle may be information generated based on the data sensed by the internal sensing unit 125.

For example, the state information of the vehicle may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle exterior temperature information, vehicle interior humidity information, and vehicle exterior brightness information.

The processor 670 may control one of the shape, size, position, color, and transparency of the graphic object displayed on the display unit 651 based on the state information.

For example, the state information of the vehicle may include posture information of the vehicle. The processor 670 may receive the posture information of the vehicle. The processor 670 may change the position of the graphic object displayed on the display unit 651 based on the posture information of the vehicle. Specifically, when the vehicle 100 is traveling, the roll, pitch, and yaw of the vehicle 100 may be continuously changed. As the roll, pitch, or yaw changes, the driver's posture and the driver's sight line may be changed by inertia. In this case, by changing the position of the graphic object based on the posture information of the vehicle, there is an effect that the augmented reality image can be continuously provided irrespective of the change of the driver's sight line.

For example, the state information of the vehicle may include traveling speed information of the vehicle. The processor 670 may receive the traveling speed information of the vehicle. The processor 670 may control the display unit 651 to change the size of the graphic object based on the traveling speed information of the vehicle. For example, when the first object is a fixed object, the distance between the vehicle 100 and the first object is proportional to the speed of the vehicle 100. In this case, the size of the graphic object is controlled to be changed based on the speed of the vehicle 100, thereby enabling the driver to intuitively recognize the distance to the first object.

The processor 670 may receive traveling situation information through the interface unit 630. Here, the traveling situation information may include vehicle interior situation information and vehicle exterior situation information.

The processor 670 may receive vehicle interior situation information from the internal sensing unit 125 through the interface unit 630. The vehicle interior situation information may also be referred to as vehicle state information.

At this time, the vehicle interior situation information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle exterior temperature information, vehicle interior humidity information, and vehicle exterior brightness information.

The processor 670 may receive the vehicle exterior situation information from the external sensing unit 126 through the interface unit 630.

At this time, the vehicle exterior situation information may be object information on an object positioned outside the vehicle.

The object may include a lane, other vehicle, a pedestrian, a light, a traffic signal, a road, a structure, and the like.

The lane may be a driving lane, or a side lane of the driving lane. The lane may include left and right lines forming a lane.

Other vehicle may be a vehicle traveling around the vehicle 100. Other vehicle may be a vehicle positioned within a certain distance from the vehicle 100. Other vehicle may be a vehicle preceding or following the vehicle 100. Other vehicle may be a vehicle traveling in a side lane of the driving lane. Other vehicle may be a vehicle that is traveling in a direction intersecting the traveling direction of the vehicle 100 at an intersection.

A pedestrian may be a person positioned on a sidewalk or driveway.

The light may be a light generated from a lamp provided in other vehicle. The light may be a light generated from a street lamp. The light may be a solar light.

A traffic signal may include a traffic light, a traffic sign, and a pattern or text drawn on the road.

The road may include a road surface, a curve, and a slope such as an uphill, and a downhill.

The structure may be an object positioned around the road and fixed to the ground. For example, the structure may include a street lamp, street trees, a building, an electric pole, a mountain, a traffic light, and the like.

The processor 670 may control the display unit 651 to further display a graphic object corresponding to the traveling situation information.

For example, the processor 670 may control the display unit 651 to display an image or text corresponding to the traveling situation information.

The processor 670 may control at least any one of an amount, a type, and a displayed area of the graphic object displayed on the display unit 651, based on the vehicle state information.

For example, the processor 670 may change the area of the graphic object corresponding to the traveling situation information displayed on the display unit 651, according to a traveling mode of the vehicle 100.

For example, when the vehicle 100 travels in a manual traveling mode, the processor 670 may display the graphic object corresponding to the object information on the outside the vehicle as augmented reality so that the graphic object is overlaid on a real object.

For example, when the vehicle 100 travels in an autonomous mode, the processor 670 may control the graphic object corresponding to the object information on the outside of the vehicle to be displayed in an edge area of the display unit.

For example, when the vehicle 100 travels in the autonomous mode, the processor 670 may control the display unit 651 to display only the vehicle exterior situation information, without displaying the vehicle interior situation information.

For example, the processor 670 may adjust the amount of the graphic object corresponding to the traveling situation information displayed on the display unit 651, according to the traveling speed of the vehicle 100.

For example, when the vehicle 100 travels at a low speed (lower than a first reference speed), the processor 670 may display more numbers of graphic objects displayed on the display unit 651 than when the vehicle travels at a high speed (second reference speed or higher). In addition, in this case, the processor 670 may display the graphic object as an augmented reality.

For example, when the vehicle 100 travels at a high speed (second reference speed or higher), the processor 670 may display less number of graphic objects displayed on the display unit 651 than when the vehicle travels at a low speed (lower than the first reference speed). In addition, in this case, the processor 670 may not display the graphic object as an augmented reality.

For example, if the vehicle 100 travels in the autonomous mode, even when the vehicle 100 travels at a low speed, the processor 670 may display more numbers of graphic objects displayed on the display unit 651 than when the vehicle travels at a high speed (second reference speed or higher). In addition, in this case, the processor 670 may display the graphic object as an augmented reality.

For example, the processor 670 may adjust the provided amount of traveling situation information, by adjusting the amount of displayed graphic object, according to the driving or stopping state of the vehicle 100.

For example, the processor 670 may also control the type of graphic object displayed, depending on the traveling or stopping state of the vehicle 100. In the traveling state of the vehicle 100, the graphic object may be displayed as a moving image. In the stopping state of the vehicle 100, the graphic object may be displayed as a still image.

Meanwhile, the processor 670 may acquire weather information through the communication unit 610. Specifically, the processor 670 may acquire weather information of the area in which the vehicle is traveling. The processor 670 may control at least one of shape, size, position, color, and transparency of the graphic object, based on the weather information.

For example, when traveling on a clear day, the processor 670 may deepen the color of the graphic object or reduce the transparency of the graphic object, in comparison with the case of driving on a cloudy day. By controlling in this way, the visibility of the graphic object may be adjusted in response to the weather.

The processor 670 may acquire map information. The processor 670 may acquire the map information stored in the memory 640. The processor 670 may acquire the map information from an external server, a mobile terminal, or other vehicle through the communication unit 610. The processor 670 may acquire the map information from other device (e.g., navigation device) in the vehicle 100 through the interface unit 630.

The processor 670 may acquire information on a second object based on the acquired map information.

The processor 670 may receive the traveling situation information through the interface unit 630. The traveling situation information may include vehicle interior situation information and vehicle exterior situation information.

The processor 670 may generate a 3D map around the vehicle, based on the map information and the traveling situation information. The processor 670 may match the object on the map with the object information acquired through the external sensing unit 126. In this case, the processor 670 may generate the 3D map information in the sensing area of the external sensing unit 126. The processor 670 may further use the sensing information of the internal sensing unit 125 such as the vehicle position information and the vehicle posture information, when generating the 3D map.

The processor 670 can determine whether the first object is hidden by the second object in the driver's sight line, based on a positional relationship between the vehicle 100, the first object, and the second object, on the 3D map.

The processor 670 may provide a signal for controlling at least one of a power source, a braking apparatus, and a steering apparatus, based on the information about the first object and the information about the second object.

The processor 670 may provide a control signal to the vehicle driving unit 150 through the interface unit 630.

For example, in a situation where the first object is hidden by the second object, when the distance between the first object and the vehicle 100 is less than a reference distance, the processor 670 provides a control signal to the brake driving unit 153 so that the distance between the vehicle 100 and the first object can be maintained.

For example, in a situation where the first object is hidden by the second object, when the distance between the first object and the vehicle 100 is less than the reference distance, the processor 670 provides a control signal to the steering driving unit 152 so that collision between the vehicle 100 and the first object can be avoided.

For example, when the distance between the first object and the vehicle 100 is equal to or larger than the reference distance in a situation where the first object is hidden by the second object, the processor 670 provides a control signal to the power source driving unit 151 so that the distance between the vehicle 100 and the first object can be maintained.

Meanwhile, the processor 670 may provide a control signal so that at least one of the ADAS functions is operated, based on the information about the first object and the information about the second object. For example, in a situation where the first object is hidden by the second object, when the distance between the first object and the vehicle 100 is less than the reference distance, the processor 670 may provide a control signal so that the AEB, FCW, ACC, or BSD are appropriately operated.

Meanwhile, the processor 670 may be implemented using at least one of an application specific integrated circuit (ASIC), digital signal processors (DSPs), digital signal processing devices (DSPDs), programmable logic devices (PLDs), field programmable gate arrays (FPGAs), processors, controllers, micro-controllers, microprocessors, and an electrical unit for performing other function.

The power supply unit 690 may supply power necessary for the operation of each component under the control of the processor 670. In particular, the power supply unit 690 may receive power from a battery or the like in the vehicle.

FIG. 7 is a diagram for explaining the internal configuration of a processor, according to an embodiment of the present invention.

Referring to FIG. 7, the processor 670 may include a driver's sight line information acquisition unit 671, a first object information acquisition unit 672, a second object information acquisition unit 673, a map information acquisition unit 674, a traveling state information acquisition unit 678, a determination unit 675, a first object tracking unit 679, a display controller 676, and a signal output unit 677.

The driver's sight line information acquisition unit 671 may acquire driver's sight line information through the internal camera 624. The driver's sight line information acquisition unit 671 may detect the eyes of the driver from the in-vehicle image acquired by the internal camera 624. The driver's sight line information acquisition unit 671 may acquire the driver's sight line information based on a driver's eye image.

The driver's sight line information may be provided to the determination unit 675.

The first object information acquisition unit 672 may acquire first object information from the external sensing unit 126 through the interface unit 630.

The first object may be an object that the vehicle driving assistance apparatus 400 or the display apparatus 600 for vehicle is tracking. For example, the first object may be any other vehicle, a pedestrian, and a traffic signal.

The first object information acquisition unit 672 may provide the first object information to the determination unit 675.

The second object information acquisition unit 673 may acquire second object information from the external sensing unit 126 through the interface unit 630.

The second object may be an object that interferes with the first object tracking. For example, the second object may be any one of other vehicle, road, or structure.

The second object information acquisition unit 673 may provide the second object information to the determination unit 675.

The map information acquisition unit 674 may acquire the map information from the navigation apparatus 300 through the interface unit 630. The map information acquisition unit 674 may acquire the map information stored in the memory 640 or acquire the map information from a device outside the vehicle 100 through the communication unit 610.

The map information acquisition unit 674 may generate a 3D map. The map information acquisition unit 674 may generate the 3D map by matching the object on the map with the object information acquired through the external sensing unit 126. The map information acquisition unit 674 may further use the sensing information of the internal sensing unit 125 such as the vehicle position information and the vehicle posture information, when generating the 3D map.

The map information acquisition unit 674 may provide the map information to the determination unit 675.

The traveling situation information acquisition unit 678 may acquire the traveling situation information through the interface unit 630. Here, the traveling situation information may include vehicle interior situation information and vehicle exterior situation information.

The traveling situation information acquisition unit 678 may receive the vehicle interior situation information from the internal sensing unit 125 through the interface unit 630.

The vehicle interior situation information may include at least one of vehicle direction information, vehicle position information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle exterior temperature information, vehicle interior humidity information, and vehicle exterior brightness information.

The traveling situation information acquisition unit 678 may receive the vehicle exterior situation information from the external sensing unit 126 through the interface unit 630. The vehicle exterior situation information may be object information on an object positioned outside the vehicle.

The traveling situation information acquisition unit 678 may provide the traveling situation information to the display controller 676.

The determination unit 675 may determine whether the second object is positioned between the vehicle 100 and the first object.

The determination unit 675 may determine, based on the driver's sight line information, whether the first object is hidden by the second object, in the driver's sight line.

The determination unit 675 may determine whether the first object is hidden by the second object in the driver's sight line, based on the positional relationship between the vehicle 100, the first object, and the second object, on the 3D map.

The determination unit 675 may determine whether the first object is positioned between the vehicle 100 and the second object, based on whether the first object is hidden by the second object, in the field of view of the camera 200.

The determination unit 675 may determine whether the position of the driver's eye detected through the internal camera 624 is escaped from the eye box.

The first object tracking unit 679 may track the first object through the information received by the V2X communication unit 615. The V2X communication unit 615 may receive position information from the first object and provide the position information to the first object tracking unit 679.

Meanwhile, according to an embodiment, the first object information acquired through the V2X communication unit 615 may be reflected in the 3D map generated by the map information acquisition unit 674.

The display controller 676 may control the display unit 651, based on the determination result of the determination unit 675.

When the second object is positioned between the vehicle 100 and the first object, the display controller 676 may generate a graphic object corresponding to the first object, and control the display unit 651 to display the graphic object on the display unit 651. The display controller 676 may control the display unit 651 to display the graphic object as augmented reality.

The display controller 676 may generate a graphic object corresponding to the first object so that the graphic object can be displayed on the display unit 651.

The display controller 676 may control the graphic object to be displayed on an area corresponding to the second object, on the front windshield.

The display controller 676 may control the graphic object to be displayed on an area corresponding to the position of the tracked first object, on the front windshield.

The display controller 676 may control the change in the size or color of the graphic object displayed on the display unit 651, based on the distance or the relative speed between the vehicle 100 and the first object.

In the driver's sight line, when the first object is hidden by the second object, the display controller 676 may display the graphic object as an augmented reality, in an area corresponding to the position of the first object among the area corresponding to the second object, on the front windshield.

The display controller 676 may control the graphic object corresponding to the hidden portion of the first object to be displayed as augmented reality while the graphic object extends to a portion of the first object that is not hidden.

When the acquired eye position is escaped from the eye box stored in the memory 640, the display controller 676 may control the display unit 651 to change the display area of the graphic object.

The display controller 676 may control any one of the shape, size, position, color, and transparency of the graphic object displayed on the display unit 651, based on the state information of the vehicle.

The state information of the vehicle may include posture information of the vehicle, traveling speed information of the vehicle, traveling mode information of the vehicle, traveling/stopping state information of the vehicle, and the like.

The display controller 676 may change the position of the graphic object displayed on the display unit 651, based on the posture information of the vehicle.

The display controller 676 may control the display unit 651 to change the size of the graphic object, based on the traveling speed information of the vehicle.

The display controller 676 may control the display unit 651 to further display the graphic object corresponding to the traveling situation information received by the traveling situation information acquisition unit 678.

The display controller 676 may control at least any one of the amount, type, and displayed area of the graphic object displayed on the display unit 651, based on the vehicle state information.

The signal output unit 677 may provide a signal for controlling at least one of the power source, the braking apparatus, and the steering apparatus, based on the first object information and the second object information.

The signal output unit 677 may provide a signal to the vehicle driving unit 150 through the interface unit 630.

FIG. 8 and FIG. 9 are diagrams for explaining a situation in which a preceding vehicle is hidden by a road slope before a vehicle enters an inclination, according to an embodiment of the present invention.

Referring to the drawings, the vehicle 100 may travel downhill as illustrated in FIG. 8. The vehicle 100 may travel uphill as illustrated in FIG. 9. Before the vehicle 100 enters an uphill road or a downhill road, a preceding vehicle 810 may be hidden by the slope 820, 830 of the road and may not be seen. The road slope 820, 830 may be positioned between the vehicle 100 and the preceding vehicle 810.

Here, the preceding vehicle 810 may be the first object. The road slope 820, 830 may be the second object.

The processor 670 may acquire information of the preceding vehicle 810 and information of the slope 820 and 830 of the road through the interface unit 630. For example, the external sensing unit 126 of the vehicle 100 may detect the preceding vehicle 810 and the slope 820 and 830 of the road. The processor 670 may receive the information of the other vehicle 810 and the information of the slope 820 and 830 of the road from the external sensing unit 126.

The processor 670 may acquire position information of the other vehicle 810 through the V2X communication unit 615. Even when the external sensing unit 126 can not detect the other vehicle 810 as other vehicle 810 is hidden by the slope 820 and 830 of the road, the processor 670 may continuously track the other vehicle 810 through the V2X communication unit 615.

The processor 670 may acquire the driver's sight line information through the internal camera 624, and determine whether the slope 820 and 830 of the road is positioned between the vehicle 100 and the preceding vehicle 810 based on the driver's sight line information. The processor 670 may determine, based on the driver's sight line information, whether the preceding vehicle 810 is hidden by the road slope 820 and 830, in the driver's sight line.

The processor 670 may generate a 3D map, and may determine whether the slope 820 and 830 of the road is positioned between the vehicle 100 and the preceding vehicle 810, based on the positional relationship between the vehicle 100 and the road 820 and 830, on the 3D map. The processor 670 may determine whether the preceding vehicle 810 is hidden by the slope 820 and 830 of the road, in the driver's sight line based on the 3D map.

FIG. 10A to FIG. 10D are diagrams for explaining a displayed graphic object in the situation of FIG. 8 and FIG. 9, according to an embodiment of the present invention.

Referring to the drawings, when the second object is positioned between the vehicle 100 and the first object, the processor 670 may generate a graphic object 1000, 1010, 1020, 1030, 1050 corresponding to the first object. The processor 670 may control the display unit 651 to display the graphic object.

The graphic object 1000, 1010, 1020, 1030, and 1050 may be displayed on the front windshield 10 of the vehicle 100. In this case, the processor 670 may control the graphic object 1000, 1010, 1020, 1030, and 1050 to be displayed as augmented reality.

The processor 670 may control to display the graphic objects 1000, 1010, 1020, 1030, 1050 on an area corresponding to the slope 820 and 830 of the road, on the windshield 10.

The processor 670 may track the preceding vehicle (810 of FIG. 8 and FIG. 9). The processor 670 may receive the position information of the preceding vehicle (810 of FIG. 8 and FIG. 9) through the V2X communication unit 615. The processor 670 may track the preceding vehicle based on the position information of the preceding vehicle (810 of FIG. 8 and FIG. 9).

The processor 670 may control the graphic object 1000, 1010, 1020, 1030, 1050 to be displayed, on the front windshield 10, in an area corresponding to the position of the tracked preceding vehicle (810 of FIG. 8 and FIG. 9).

As illustrated in FIG. 10A, the processor 670 may display the graphic object 1000, 1010 corresponding to the preceding vehicle (810 of FIG. 8 and FIG. 9).

The processor 670 may display a text 1010 as a graphic object. The processor 670 may display an arrow shape 1000 as a graphic object. At this time, the processor 670 may display the arrow shape 1000 so that the direction of the preceding vehicle (810 of FIG. 8 and FIG. 9) and the direction of the arrow shape 1000 coincide with each other.

As illustrated in FIG. 10B and FIG. 10C, the processor 670 may display a vehicle image 1020, 1030, which has a similar shape to the preceding vehicle (810 of FIG. 8 and FIG. 9), as a graphic object.

The processor 670 may adjust the change in the size or the change in color of the vehicle image 1020, 1030, based on the distance between the vehicle 100 and the preceding vehicle 810.

For example, as the vehicle 100 approaches the preceding vehicle 810, the processor 670 may display the vehicle image 1020, 1030 gradually larger. In addition, as the vehicle 100 and the preceding vehicle 810 are getting farther away, the processor 670 may display the vehicle image 1020, 1030 gradually smaller.

For example, as the vehicle 100 approaches the preceding vehicle 810, the processor 670 may display the color of the vehicle image 1020, 1030 gradually deeper. In addition, as the vehicle 100 and the preceding vehicle 810 are getting farther away, the processor 670 may display the color of the vehicle image 1020, 1030 gradually lighter.

The processor 670 may adjust the change in the size or color of the vehicle image 1020, 1030, based on the relative speed between the vehicle 100 and the preceding vehicle 810.

For example, as the relative speed between the vehicle 100 and the preceding vehicle 810 decreases, the processor 670 may display the vehicle image 1020, 1030 gradually larger. Further, as the relative speed between the vehicle 100 and the preceding vehicle 810 increases, the processor 670 may display the vehicle image 1020, 1030 gradually smaller.

For example, as the relative speed between the vehicle 100 and the preceding vehicle 810 decreases, the processor 670 may display the color of the vehicle image 1020, 1030 gradually deeper. In addition, as the relative speed between the vehicle 100 and the preceding vehicle 810 increases, the processor 670 may display the color of the vehicle image 1020, 1030 gradually lighter.

As illustrated in FIG. 10D, when a part of the preceding vehicle 810 is hidden by the slope 820, 830 of road, the processor 670 may control the display unit 651 to display a partial vehicle image 1050 corresponding to the hidden part.

The processor 670 may control the display unit 651 such that the partial vehicle image 1050 is displayed as augmented reality while it extends to a portion of the preceding vehicle 810 that is not hidden.

FIG. 11 is a diagram for explaining a situation in which other vehicle is hidden by a building before entering an intersection according to an embodiment of the present invention.

Referring to the drawing, the vehicle 100 may travel an intersection, as illustrated in FIG. 11. Before entering the intersection, other vehicle 1110 may be hidden by a neighboring building 1120, while other vehicle 100 is traveling in the direction intersecting with the traveling direction of the vehicle 100 at the intersection. The building 1120 may be positioned between the vehicle 100 and other vehicle 1110.

Here, other vehicle 1110 that is traveling in the direction intersecting with the traveling direction of the vehicle 100 may be the first object. The building 1120 positioned around the road may be the second object.

The processor 670 may acquire information of other vehicle 1110 that is traveling in the direction intersecting with the traveling direction of the vehicle 100 and information of the building 1120 around the road. For example, the external sensing unit 126 of the vehicle 100 may detect other vehicle 1110 and the building 1120, and the processor 670 may acquire the information of other vehicle 1110 and the information of the building 1120 from the external sensing unit 126.

The processor 670 may acquire position information of other vehicle 1110 through the V2X communication unit 615. Even when the external sensing unit 126 can not detect other vehicle 1110 as other vehicle 1110 is hidden by the building 1120, the processor 670 may continuously track other vehicle 1110 through the V2X communication unit 615.

The processor 670 may acquire the driver's sight line information through the internal camera 624, and determine whether the building 1120 is positioned between the vehicle 100 and the other vehicle 1110 that is traveling in the direction intersecting with the traveling direction of the vehicle 100, based on driver's sight line information, The processor 670 may generate a 3D map, and determine whether the building 1120 is positioned between the vehicle 100 and the other vehicle 1110 that is traveling in the direction intersecting with the traveling direction of the vehicle 100, on the 3D map. The processor 670 may determine whether other vehicle 1110 is hidden by the building 1120 in the driver's sight line based on the 3D map.

FIG. 12 is a diagram for explaining a displayed graphic object in the situation of FIG. 11, according to an embodiment of the present invention.

Referring to FIG. 12, when the building 1120 is positioned between the vehicle 100 and the other vehicle 1110 that is traveling in the direction intersecting with the traveling direction of the vehicle 100, the processor 670 may generate a graphic object 1210 corresponding to other vehicle 1110. The processor 670 may control the display unit 651 to display the graphic object 1210. Here, the graphic object may be an image 1210 of the vehicle.

The graphic object 1210 may be displayed on the front windshield 10 of the vehicle 100. In this case, the processor 670 may control the graphic object 1210 to be displayed as an augmented reality.

The processor 670 may control the display unit 651 to display, on the front windshield, the graphic object 1210 in an area corresponding to the building 1120.

The processor 670 may control the display unit 651 to display the graphic object 1210 in an area corresponding to the position information of other vehicle 1110 received through the V2X communication unit 615.

FIG. 13 is a diagram for explaining a situation in which a pedestrian is hidden by other vehicle during traveling of vehicle, according to an embodiment of the present invention.

Referring to FIG. 13, during traveling, the vehicle 100 may not see the pedestrian 1310 that crosses the roadway, as the pedestrian 1310 is hidden by other vehicle 1320 that is stopped on the roadway, as illustrated in FIG. 13. The other vehicle 1320 may be positioned between the vehicle 100 and the pedestrian 1310.

Here, the pedestrian 1310 that crosses the roadway may be the first object. The other vehicle 1320, which is stopped on the roadside, may be the second object.

The processor 670 may acquire information of the pedestrian 1310 that crosses the roadway and information of other vehicle 1320 that is stopped on the roadside, through the interface unit 630. For example, the external sensing unit 126 of the vehicle 100 may detect the pedestrian 1310 and other vehicle 1320, and the processor 670 may receive information of the pedestrian 1310 and other vehicle 1320 from the external sensing unit 126.

The processor 670 may acquire the position information of the pedestrian 1310, through the V2X communication unit 615. Specifically, the processor 670 may acquire the position information of the mobile terminal through the V2X communication unit 615 by communicating with the mobile terminal carried by the pedestrian 1310. At this time, the position information of the mobile terminal may be the information of the pedestrian. Even when the pedestrian 1310 is hidden by other vehicle 1320 and the external sensing unit 126 can not detect the pedestrian, the processor 670 may continuously track the pedestrian 1310 through the V2X communication unit 615.

The processor 670 may acquire the driver's sight line information through the internal camera 624, and may determine whether other vehicle 1320 stopped on the roadside is positioned between the vehicle 100 and the pedestrian 1310 crossing the roadway, based on the driver's sight line information. The processor 670 may determine whether the pedestrian 1310 is hidden by other vehicle 1320 in the driver's sight line, based on the driver's sight line information.

The processor 670 may generate a 3D map, and may determine whether other vehicle 1320 stopped on the roadside is positioned between the vehicle 100 and the pedestrian 1310 crossing the roadway, on the 3D map. The processor 670 may determine, based on the 3D map, whether the pedestrian 1310 is hidden by other vehicle 1320 in the driver's sight line.

FIG. 14 is a diagram for explaining a displayed graphic object in the situation of FIG. 13, according to an embodiment of the present invention.

Referring to FIG. 14, when other vehicle 1320 stopped on the roadside is positioned between the vehicle 100 and the pedestrian 1310 crossing the roadway, the processor 670 may generate a graphic object 1410 corresponding to the pedestrian 1310. The processor 670 may control the display unit 651 to display the graphic object 1410. Here, the graphic object may be a pedestrian image 1410.

The graphic object 1410 may be displayed on the front windshield 10 of the vehicle 100. In this case, the processor 670 may control the graphic object 1410 to be displayed as an augmented reality.

The processor 670 may control the display unit 651 to display the graphic object 1410 in an area corresponding to other vehicle 1320 on the front windshield.

The processor 670 may control the display unit 651 to display the graphic object 1410 in an area corresponding to the position information of the pedestrian 1310 received through the V2X communication unit 615.

FIG. 15 is a diagram for explaining a situation in which a preceding vehicle is hidden by a road surrounding terrain, before a vehicle enters a corner, according to an embodiment of the present invention.

Referring to FIG. 15, the vehicle 100 may travel a curve section as illustrated in FIG. 15. Before the vehicle 100 enters the curve section, the preceding vehicle 1510 may be hidden by a road surrounding terrain 1520 and may not be seen. The terrain 1520 may be positioned between the vehicle 100 and other vehicle 1510.

Here, the preceding vehicle 1510 may be the first object. The terrain 1520 positioned around the road may be the second object.

The processor 670 may acquire the information of other vehicle 1510 preceding the vehicle 100 and the information of the terrain 1520 positioned around the road, through the interface unit 630. For example, the external sensing unit 126 of the vehicle 100 may detect other vehicle 1510 and the terrain 1520, and the processor 670 may receive the information of other vehicle 1510 and the information of the terrain 1520 from the external sensing unit 126.

The processor 670 may acquire the position information of other vehicle 1510 through the V2X communication unit 615. Even if the other vehicle 1510 is hidden by the terrain 1520 and the external sensing unit 126 can not detect other vehicle 1510, the processor 670 may continuously track other vehicle 1510 through the V2X communication unit 615.

The processor 670 may acquire driver's sight line information through the internal camera 624, and may determine whether the terrain 1520 is positioned between the vehicle 100 and other vehicle 1510 preceding the vehicle 100, based on the driver's sight line information. The processor 670 may determine, based on the driver's sight line information, whether other vehicle 1510 is hidden by the terrain 1520 in the driver's sight line.

The processor 670 may generate a 3D map, and determine, on the 3D map, whether the terrain 1520 is positioned between the vehicle 100 and other vehicle 1510 preceding the vehicle 100. The processor 670 may determine, based on the 3D map, whether other vehicle 1520 is hidden by the terrain 1520 in the driver's sight line.

Meanwhile, the terrain 1520 may be an object, such as a mountain, which is formed to have a certain volume on the ground.

FIG. 16 is a diagram for explaining a displayed graphic object in the situation of FIG. 15, according to an embodiment of the present invention.

Referring to FIG. 16, when the terrain 1520 is positioned between the vehicle 100 and other vehicle 1510 preceding the vehicle 100, the processor 670 may generate the graphic object corresponding to other vehicle 1510. The processor 670 may control the display unit 651 to display the graphic object 1610. Here, the graphic object may be a certain graphic image 1610.

The graphic object 1610 may be displayed on the front windshield 10 of the vehicle 100. In this case, the processor 670 may control the graphic object 1610 to be displayed as an augmented reality.

The processor 670 may control to display the graphic object 1610 in an area corresponding to the terrain 1520, on the front windshield.

The processor 670 may control the display unit 651 to display the graphic object 1610 in an area corresponding to the position information of other vehicle 1520 received through the V2X communication unit 615.

Meanwhile, in a state in which other vehicle 1520 is hidden by the second object, the processor 670 may control the display unit 651 to display the graphic object for guiding the brake control as an augmented reality, based on distance information on distance between the vehicle 100 and the preceding vehicle 1520.

For example, when the distance between the vehicle 100 and other vehicle 1520 is within a first range, the processor 670 may superimpose a first image 1621 of a first color or a first size on a travel road. Here, the first image 1621 may be an image for guiding the driver to perform the braking of a first step.

For example, when the distance between the vehicle 100 and other vehicle 1520 is within a second range, the processor 670 may superimpose a second image 1622 of a second color or a second size on the travel road. Here, the second image 1622 may be an image for guiding the driver to perform the braking of a second step.

For example, when the distance between the vehicle 100 and other vehicle 1520 is within a third range, the processor 670 may superimpose a third image 1623 of a third color or a third size on the travel road. Here, the third image 1623 may be an image for guiding the driver to perform the braking of a third step.

FIG. 17 is a diagram for explaining various graphic objects according to an embodiment of the present invention.

The processor 670 may control the display unit 651 such that various graphics objects 1710, 1720, 1725, 1730, 1740, and 1750 are displayed as augmented reality.

For example, if a traffic sign is positioned around, the processor 670 may display an image 1710 corresponding to the traffic sign.

For example, if passenger's preferred store is positioned around, the processor 670 may display an image 1720 corresponding to the store as an augmented reality. In this case, the display apparatus 100 for vehicle may receive a user input through the sound input unit 622, and make an automatic reservation telephone call to the store.

For example, if a traffic light is positioned around, the processor 670 may display an image 1725 corresponding to the traffic light as an augmented reality. At this time, the processor 670 may display signal conversion time information of the traffic light together.

For example, if remaining fuel in the vehicle 100 is insufficient, the processor 670 may display an image 1730 corresponding to a nearby gas station as an augmented reality. At this time, the processor 670 may display oil price information of the nearby gas station together.

For example, if a lane merge point is positioned around, the processor 670 may display an image 1740 corresponding to the lane merge point. At this time, the processor 670 may display recommended lane guide information for lane merging together. In this case, the processor 670 may provide the lamp driving unit 154 with a control signal for turning on a turn signal lamp so as to enter the lane merging point.

For example, if an underpass is positioned around, the processor 670 may display an image 1750 corresponding to the entry of underpass. At this time, the processor 670 may display air pollution state information together, before entering the underpass. In this case, the processor 670 may provide the window driving unit 157 with a control signal for window closing, before entering the underpass. The processor 670 may also provide the air conditioning driving unit 155 with a control signal for turning on the air purification function.

Meanwhile, when a dangerous situation is avoided, the processor 670 may output dangerous situation avoiding information through the output unit 650.

FIG. 18 is a diagram for explaining a 3D drawing according to an embodiment of the present invention.

Referring to FIG. 18, the processor 670 may acquire map information. The map information may include surrounding space information based on the vehicle 100. For example, the map information may include information related to road, terrain, structure, and the like around the vehicle 100.

The processor 670 may receive sensed external situation information of the vehicle 100 from the external sensing unit 126. Specifically, the processor 670 may receive information of object positioned outside the vehicle 100 from the external sensing unit 126.

The processor 670 may generate a 3D map 1800 by fusion of the map information and the external situation information. The processor 670 may match the object on the map with the object information acquired through the external sensing unit 126.

The processor 670 may implement, on the 3D map, a road 1811, the terrain, and a structure 1812 acquired from the map information, tridimensionally. In addition, the processor 670 may implement other vehicle 1821 and the pedestrian 1822 acquired from the external situation information, in three dimensions.

The processor 670 may determine whether the first object is hidden by the second object in the driver's sight line, based on the positional relationship between the vehicle 100, the first object, and the second object, on the 3D map.

FIG. 19 is a conceptual diagram for explaining an operation of a display apparatus 600 for vehicle to implement an augmented reality image through a windshield 10 according to an embodiment of the present invention. In FIG. 19, it is assumed that the display apparatus 600 for vehicle is a HUD.

In the following description, the augmented reality image may be an example of a graphic object.

Referring to FIG. 19, the display apparatus 600 for vehicle may include a display panel 1942, a first mirror 1944, and a second mirror 1946.

The display panel 1942 is provided with a backlight unit so that a display light for implementing an augmented reality image can be projected toward the windshield 10 under the control of the processor 670.

The processor 670 may be operatively connected to the internal camera 624, the external camera 200, and the display panel 1942, generate image data for forming a specific augmented reality image based on the image provided from the internal camera 624 and/or the external camera 200, and provide the image data to the display panel 1942. For example, the image data for forming the augmented reality image may be implemented in a bit map format.

In an embodiment, the processor 670 may detect a specific object 1901 existing in front of the vehicle 100 based on the forward image provided from the external camera 200, and may provide the display panel 1942 with the image data for forming the augmented reality image corresponding to the detected object 1901.

The display panel 1942 may output the display light corresponding to the augmented reality image to the first mirror 1944 based on the image data provided from the processor 670. The second mirror 1946 may reflect again the display light reflected from the first mirror 1944 to the windshield 10 so that the augmented reality image can be implemented through the windshield 10. The size of the display light corresponding to the augmented reality image may be enlarged or the projection position for the windshield 10 may be adjusted by an optical path from the display panel 1942 to the windshield 10.

Meanwhile, the display light reflected by the second mirror 1946 may be projected into a preset area (hereinafter, display area) of the windshield 10. In a display area 1920, a reflection film may be attached so that the augmented reality image 1930 can be seen more clearly.

At this time, the augmented reality image is implemented by the display light projected on the windshield 10. In the driver's position, the augmented reality image 1930 may be seen as being displayed outside the vehicle 100 beyond the display area 1920, not seen on the display area 1920 of the windshield 10. That is, the augmented reality image 1930 may be recognized as a virtual image that seems to float in front of the vehicle 100 by a certain distance. For example, the augmented reality image 1930 may be a graphic object that provides information about the contours, speed, collision alerts, and the like of the object 1901.

When the display apparatus 600 for vehicle implements the augmented reality image 1930 through a virtual image, in order for the driver to recognize the augmented reality image 1930 through the display area 1920, the eye position of the driver should be positioned within the eye box 1910. The eye box 1910 is a space in the interior of the vehicle 100 having a three-dimensional volume. When the eyes of the driver are positioned within the eye box 1910, the augmented reality image 1930 can be verified through the display area 1920. Meanwhile, when the driver's eye escapes from the eye box 1910, only a portion of the augmented reality image 1930 may be visible, or the augmented reality image 1930 may not be visible at all. In the memory 640, coordinate values defining the boundary of the eye box 1910 may be previously stored.

Meanwhile, in the case where the driver's eye is positioned within the eye box 1910, even if the driver can recognize the augmented reality image 1930, depending on the eye position change in the eye box 1910, there may occur an error between the actual image of the object 1901 recognized by the driver through the display area 1920 and the augmented reality image 1930. This is a phenomenon that occurs because the distance to the augmented reality image 1930 is different from the distance to the object 1901 based on the position of the driver. As the object 1901 is relatively farther away, the error with respect to the augmented reality image 1930 may be gradually increased. In order to reduce or eliminate such an error, the processor 670 may post-process the augmented reality image 1930, based on the driver's eye position.

Specifically, the processor 670 may detect the driver's eye position from the driver image provided from the internal camera 624. In an embodiment, the processor 670 may detect the eyes of the driver appearing in the driver image using an eye tracking technique, and calculate a three-dimensional coordinate value of the detected eyes. In another embodiment, the processor 670 may extract the driver's facial contour from the driver image using an edge detection technique, and estimate the driver's eye position based on the extracted contour.

The memory 640 may have preset information on a reference position, and the processor 670 may compare the driver's eye position with the reference position and calculate the direction and distance of the eye position with respect to the reference position. That is, the processor 670 may determine how far the driver's current eye position is from the reference position.

The processor 670 may determine a visual effect to apply to post-processing for the augmented reality image, depending on the direction and distance of the eye position with respect to the reference position. In addition, the processor 670 may determine the size of the determined visual effect.

The processor 670 may post-process the augmented reality image 1930 using the determined visual effect, thereby suppressing an error of the object 1901 occurred by the eye position change within the eye box 1910 with respect to the actual image, and providing the driver with more improved inter-image matching results.

The visual effects applicable to post-processing for the augmented reality image may include at least one of blurring, repositioning, resizing, shape modification, and slope change for the augmented reality image. For example, when a horizontal error occurs between the augmented reality image and the actual image of the object as the driver's eye position changes in left and right directions along the y axis, the processor 670 may compensate the discrepancy between the two images, by horizontally moving the augmented reality image toward the actual image, or through visual effects such as width-extension of the augmented reality image or blurring of at least a portion of the augmented reality image.

The present invention described above can be implemented as computer readable codes on a medium on which a program is recorded. The computer readable medium includes all kinds of recording apparatuses in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and may also be implemented in the form of a carrier wave (e.g., transmission over the Internet). In addition, the computer may include a processor 170 or a controller 770. Accordingly, the above detailed description is to be considered in all respects as illustrative and not restrictive. The scope of the present invention should be determined by rational interpretation of the appended claims, and all changes within the scope of equivalents of the present invention are included in the scope of the present invention.

The invention claimed is:

1. A display apparatus for a vehicle, the apparatus comprising:
    a display;
    an interface;
    an external sensor configured to detect and track an object positioned outside of the vehicle;
    a V2X communicator configured to exchange data with a first object; and
    a processor configured to:
        receive information on the first object and a second object through the interface, the first and second objects being positioned outside of the vehicle,
        control the display to display a graphic object corresponding to the first object based on the second object being positioned between the vehicle and the first object,
        receive detection and tracking information of the first object from the external sensor through the interface, and
        based on the first object being hidden by the second object while the external sensor tracks the first object, receive position information of the first object through the V2X communicator and track the first object based on the position information.

2. The apparatus of claim 1, wherein the graphic object is displayed on a front windshield of the vehicle, and
    wherein the processor is configured to control the graphic object to be displayed as augmented reality.

3. The apparatus of claim 2, wherein the processor is configured to control the graphic object to be displayed on an area corresponding to the second object on the front windshield.

4. The apparatus of claim 2, wherein the processor is configured to control the graphic object to be displayed on an area corresponding to a position of the tracked first object, on the front windshield.

5. The apparatus of claim 4, wherein the processor is configured to control a change of a size or color of the graphic object displayed on the display based on a distance or relative speed between the vehicle and the first object.

6. The apparatus of claim 1,
    wherein the processor is configured to, based on a first part of the first object being hidden by the second object, control the display to extend the graphic object to a second part of the first object that is not hidden by the second object.

7. The apparatus of claim 6, wherein the processor is configured to change a size of the graphic object corresponding to the first object based on a change of a relative size of the first part of the first object with respect to the second part of the first object.

8. The apparatus of claim 6, wherein the processor is configured to display the graphic object corresponding to the first object to a windshield of the vehicle such that the graphic object of the first part of the first object connects to the second part of the first object visible through the windshield of the vehicle.

9. The apparatus of claim 1, further comprising an internal camera configured to acquire a vehicle interior image,
    wherein the processor is configured to acquire sight line information of a driver of the vehicle through the internal camera, and to determine, based on the sight line information, whether the first object is hidden by the second object in a sight line of the driver.

10. The apparatus of claim 9, wherein the processor is configured to display the graphic object as augmented reality in an area corresponding to a position of the first object among an area corresponding to the second object on a front windshield of the vehicle based on the first object being hidden by the second object in the sight line of the driver.

11. The apparatus of claim 9, further comprising a memory configured to store eye box coordinate information corresponding to a driver,
    wherein the processor is configured to acquire position information of an eye of the driver through the internal camera and to control the display to change a display area of the graphic object when a position of the eye is located outside of an eye box.

12. The apparatus of claim 1, wherein the processor is configured to receive state information of the vehicle through the interface and to control at least one of a shape, size, position, color, or transparency of the graphic object displayed on the display based on the state information.

13. The apparatus of claim 12, wherein the state information comprises posture information of the vehicle, and
    wherein the processor is configured to change the position of the graphic object displayed on the display based on the posture information.

14. The apparatus of claim 12, wherein the state information comprises speed information of the vehicle, and
    wherein the processor is configured to control the display so that the size of the graphic object is changed, based on the speed information.

15. The apparatus of claim 12, wherein the processor is configured to receive traveling situation information through the interface and to control the display to further display the graphic object corresponding to the traveling situation information.

16. The apparatus of claim 15, wherein the processor is configured to control at least one of an amount, a type, or a displayed area of the graphic object corresponding to the traveling situation information displayed on the display based on the state information.

17. The apparatus of claim 1, wherein the processor is configured to acquire map information and information on the second object based on the map information.

18. The apparatus of claim 17, wherein the processor is configured to receive traveling situation information from a sensor through the interface and to generate a three-dimensional (3D) map based on the map information and the traveling situation information.

19. The apparatus of claim 18, wherein the processor is configured to determine whether the first object is hidden by the second object in a sight line of a driver of the vehicle based on positional relationship between the vehicle, the first object, and the second object on the 3D map.

20. The apparatus of claim 1, wherein the processor is configured to provide a signal for controlling at least one of a power source, a braking apparatus, or a steering apparatus based on the information on the first object and the second object.

\* \* \* \* \*